United States Patent
Enke et al.

(10) Patent No.: US 10,582,259 B2
(45) Date of Patent: Mar. 3, 2020

(54) PIPELINED VIDEO INTERFACE FOR REMOTE CONTROLLED AERIAL VEHICLE WITH CAMERA

(71) Applicant: GoPro, Inc., San Mateo, CA (US)

(72) Inventors: Joseph Anthony Enke, San Francisco, CA (US); Anupam Joshi, Palo Alto, CA (US)

(73) Assignee: GoPro, Inc., San Mateo, CA (US)

( * ) Notice: Subject to any disclaimer, the term of this patent is extended or adjusted under 35 U.S.C. 154(b) by 371 days.

(21) Appl. No.: 15/197,579

(22) Filed: Jun. 29, 2016

(65) Prior Publication Data

US 2017/0006340 A1 Jan. 5, 2017

Related U.S. Application Data

(60) Provisional application No. 62/187,200, filed on Jun. 30, 2015.

(51) Int. Cl.
*H04N 21/4402* (2011.01)
*H04N 7/18* (2006.01)
(Continued)

(52) U.S. Cl.
CPC ... *H04N 21/440281* (2013.01); *B64C 39/024* (2013.01); *H04L 65/602* (2013.01);
(Continued)

(58) Field of Classification Search
CPC ..... H04N 21/440281; H04N 21/43637; H04N 5/2253; H04N 7/185; H04L 65/602; B64C 39/024; B64C 2201/146; B64C 2201/127
See application file for complete search history.

(56) References Cited

U.S. PATENT DOCUMENTS

| | | | |
|---|---|---|---|
| 2006/0150071 A1* | 7/2006 | Chen | H04N 19/159 715/203 |
| 2012/0243602 A1* | 9/2012 | Rajamani | H04L 1/0008 375/240.02 |

(Continued)

FOREIGN PATENT DOCUMENTS

| WO | WO 2008/115416 A1 | 9/2008 |
|---|---|---|
| WO | WO 2012/040565 A1 | 3/2012 |
| WO | WO 2013/098643 A2 | 7/2013 |

OTHER PUBLICATIONS

PCT International Search Report and Written Opinion for PCT/US2016/040272, dated Dec. 8, 2016, 19 Pages.

(Continued)

*Primary Examiner* — Christopher S Kelley
*Assistant Examiner* — Nasim N Nirjhar
(74) *Attorney, Agent, or Firm* — Young Basile Hanlon & MacFarlane, P.C.

(57) ABSTRACT

Disclosed is a system and method for reducing the total latency for transferring a frame from the low latency camera system mounted on an aerial vehicle to the display of the remote controller. The method includes reducing the latency through each of the modules of the system, i.e. through a camera module, an encoder module, a wireless interface transmission, wireless interface receiver module, a decoder module and a display module. To reduce the latency across the modules, methods such as overclocking the image processor, pipelining the frame, squashing the processed frame, using a fast hardware encoder that can perform slice based encoding, tuning the wireless medium using queue sizing, queue flushing, bitrate feedback, physical medium rate feedback, dynamic encoder parameter tuning and wireless radio (Continued)

parameter adjustment, using a fast hardware decoder that can perform slice based decoding and overclocking the display module are used.

20 Claims, 19 Drawing Sheets

(51) Int. Cl.
    *H04N 5/225*     (2006.01)
    *H04N 21/4363*     (2011.01)
    *B64C 39/02*     (2006.01)
    *H04L 29/06*     (2006.01)

(52) U.S. Cl.
    CPC ........... *H04N 5/2253* (2013.01); *H04N 7/185* (2013.01); *H04N 21/43637* (2013.01); *B64C 2201/127* (2013.01); *B64C 2201/146* (2013.01)

(56) References Cited

U.S. PATENT DOCUMENTS

| | | | |
|---|---|---|---|
| 2013/0205169 A1 | 8/2013 | Gaither | |
| 2014/0101478 A1* | 4/2014 | Tal | G06F 1/324 |
| | | | 713/600 |
| 2015/0350483 A1* | 12/2015 | Holtsberg | H04N 1/2112 |
| | | | 348/231.2 |
| 2016/0147249 A1* | 5/2016 | Gendler | G06F 1/324 |
| | | | 713/501 |
| 2016/0330782 A1* | 11/2016 | Ang | H04W 76/025 |

OTHER PUBLICATIONS

PCT Invitation to Pay Additional Fees and, Where Applicable, Protest Fee, for PCT/US2016/040272, dated Oct. 17, 2016, 7 Pages.

* cited by examiner

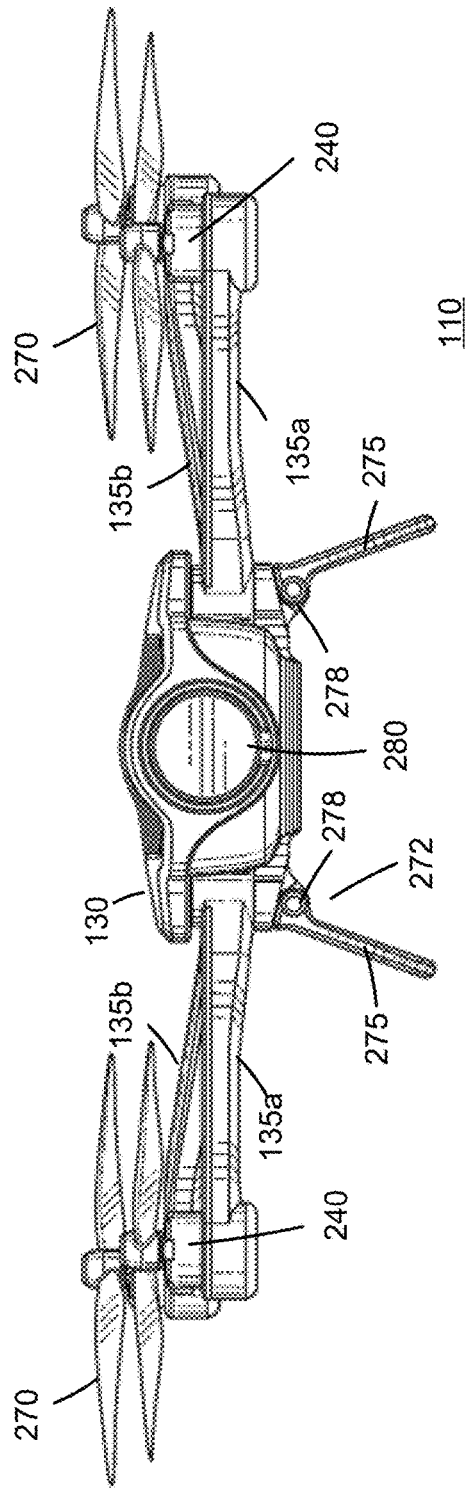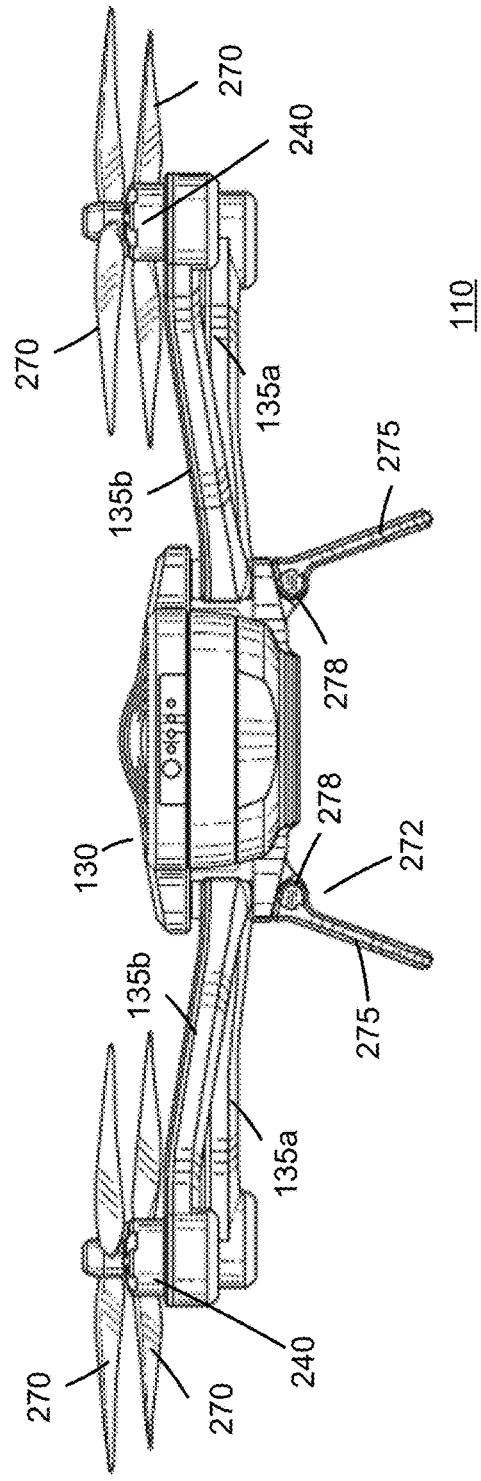

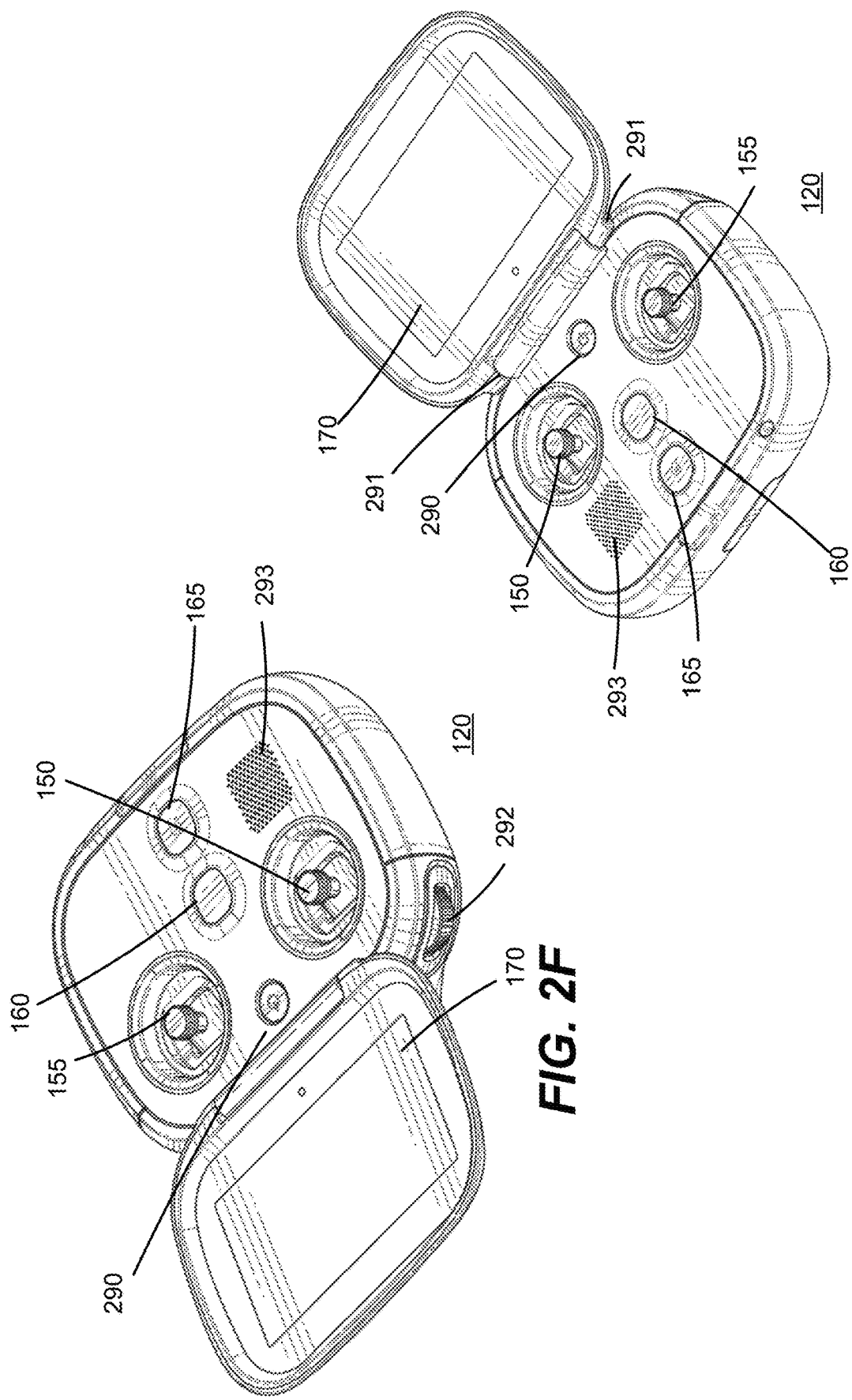

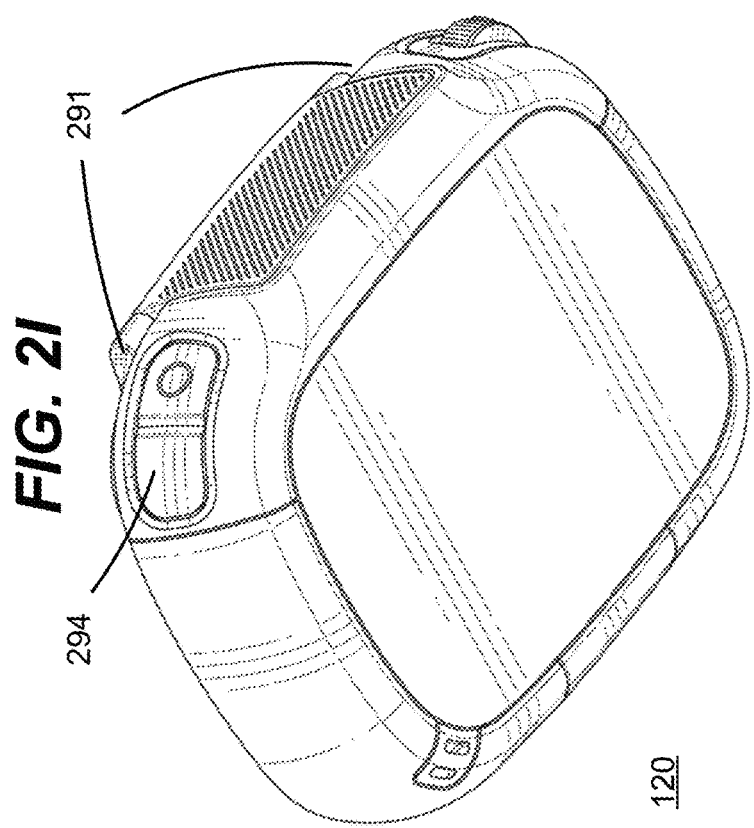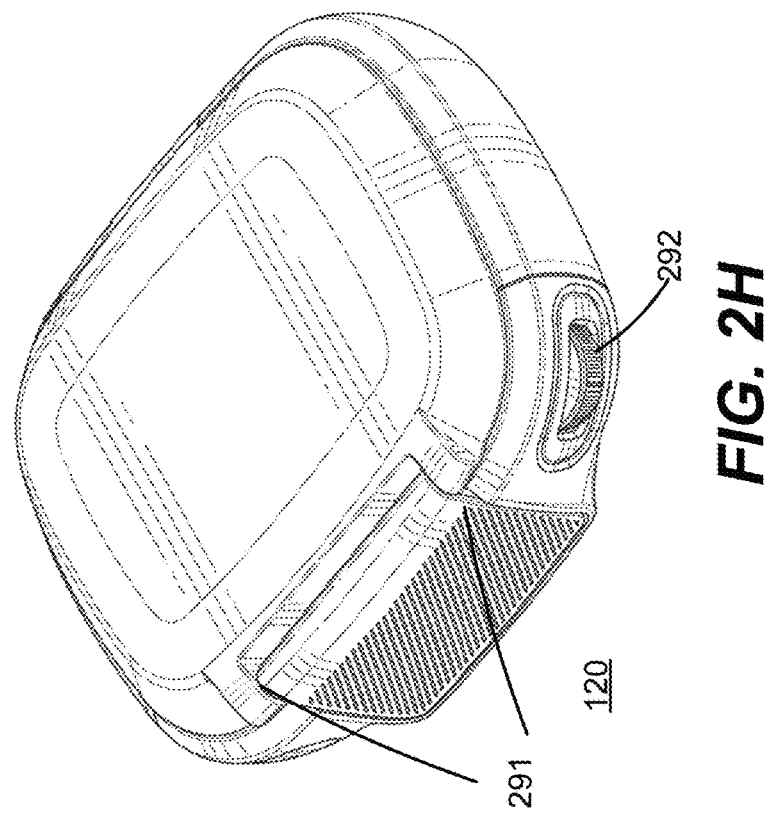

PIPELINED VIDEO INTERFACE FOR REMOTE CONTROLLED AERIAL VEHICLE WITH CAMERA

CROSS REFERENCE TO RELATED APPLICATION

This application claims the benefit of U.S. Provisional Application No. 62/187,200, filed Jun. 30, 2015, the content of which is incorporated by reference in its entirety.

TECHNICAL FIELD

The disclosure generally relates to the field of pipelining video interface and in particular a pipelining a video interface for a low latency camera system.

BACKGROUND

Remote controlled devices with cameras mounted upon those devices are known. For example, a remote control road vehicle can be configured to mount a camera on it to capture images as the vehicle is moved about remotely by a user. Similarly, remote controlled unmanned aerial vehicles, e.g., drones such as quadcopters, have been mounted with cameras to capture aerial images through the camera as a user remotely controls the aerial vehicle.

Most cameras mounted on remote controlled vehicles do not take into consideration a multitude of issues involving the camera itself in relation to the vehicle to which it is mounted. These issues include, for example, using a non-dedicated camera and corresponding securing structure that is best suited to mount the camera to the remote controlled vehicle and use of a mounting configuration that allows the vehicle to remain in balance when coupled with a camera.

Yet another issue is being able to transfer the video or images captured by the camera mounted on the remote controlled vehicle to the display screen on the controller. The transfer takes place through a wireless interface between the camera system mounted on the remote controlled vehicle and the controller. To ensure that the transfer must be as seamless as possible, the latency of the wireless transfer of images must be low. To achieve low latency is a complex process and it is even harder to reduce the latency when the camera is moving with the remote controlled vehicle at a variable speed.

Hence, there is a need to resolve these and other issues involved with transferring images or video frames from the camera system to the controller.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 2D illustrates an example of an aerial vehicle from a first end view.

FIG. 2E illustrates an example of an aerial vehicle from a second end view.

FIGS. 2F and 2G illustrate an example remote controller in an open position.

FIGS. 2H and 2I illustrate an example remote controller in a closed position.

DETAILED DESCRIPTION

Figure 1:
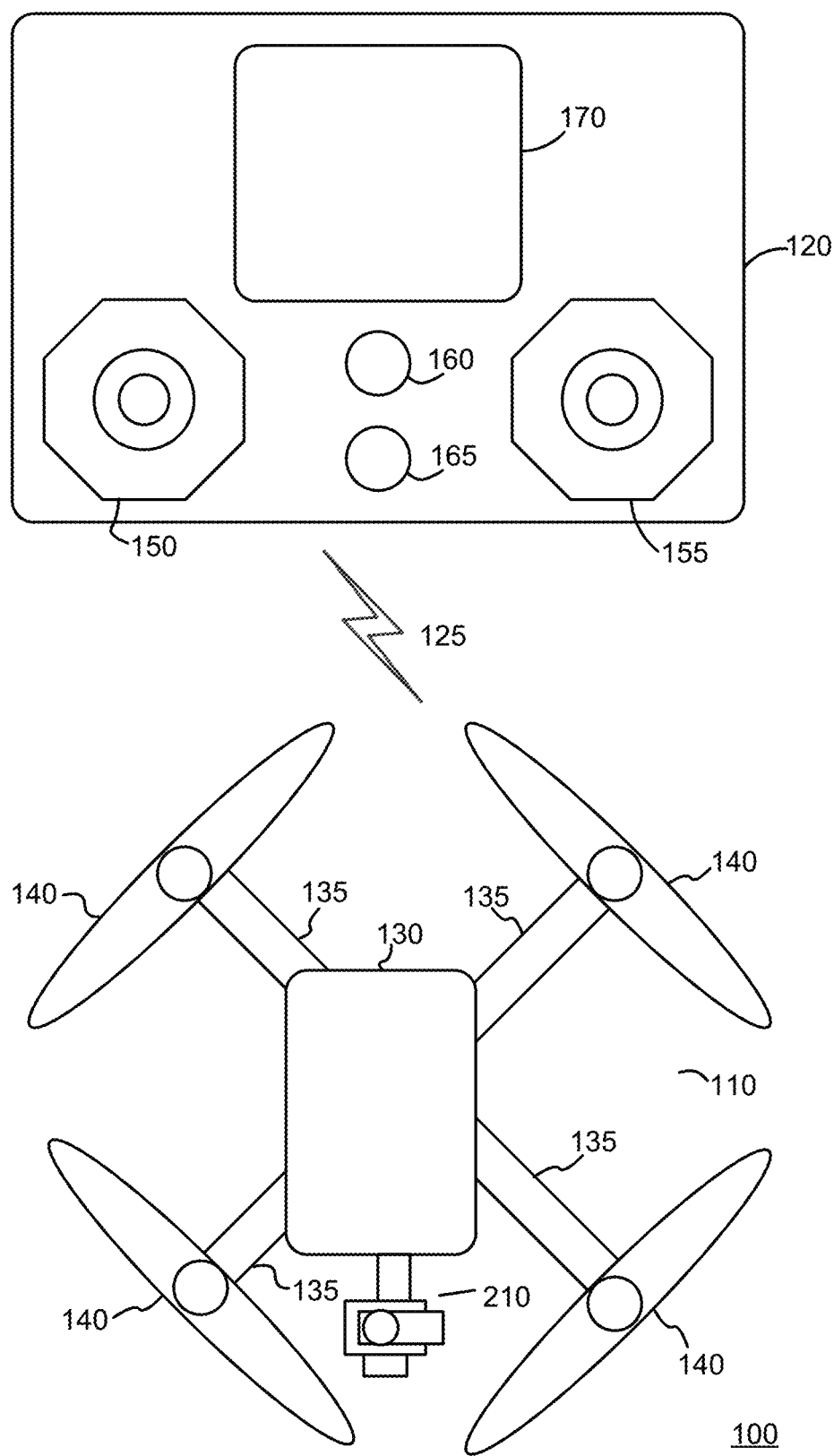
FIG. 1 illustrates an example configuration of remote controlled aerial vehicle in communication with a remote controller.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is a video pipeline interface for an aerial capture platform. The aerial capture platform may include a remote controlled aerial vehicle coupled with a camera and may include a remote controller. The remote controlled aerial vehicle may also be referenced as an unmanned aerial vehicle ("UAV") and/or drone. The aerial vehicle may be remotely controlled through a remote controller. The camera further may be coupled with a mounting structure (or configuration).

The remote controlled aerial vehicle can be directly and immediately controlled for flight. For example, the aerial vehicle may be operated remotely (e.g., via wireless connection) from a remote controller by a user. Remote controlled aerial vehicles may be pre-programmed for flight (e.g., a predetermined flight route (or path) as further described herein), and no control, or limited control, may be exercised via the remote controller during flight. Such configurations may be referred to as autopilot. Examples of limited control may be a manual override or a flight adjustment to the pre-programmed flight. For ease of discussion reference to aerial vehicle operation can refer to user controlled, autopilot and other instances of unmanned aerial vehicle flights.

The aerial vehicle may include a mounting structure that couples with a camera and can secure it. The mounting structure may be removably attachable from the aerial vehicle 110. The mounting structure may include a gimbal to couple with the camera, which can assist with stabilization for image or a video capture (generally termed as a frame). A frame may be a still image (e.g., picture) or may be a frame within a series of frames that comprises a video. Moreover, the camera can be configured so that it may be removably attachable from the mounting structure and can operate as a standalone camera. The camera and mounting structure may also be compatible with other mounting solutions, for example, a handheld (or portable) handle, pole, sports board mount, etc. In some example embodiments, the aerial vehicle may include an integrated camera. The integrated camera also may incorporate a gimbal.

Also disclosed is a configuration for a remote controlled aerial vehicle to wirelessly transfer images or video frames from the camera mounted on the remote controlled aerial vehicle to the display on a remote controller of the aerial vehicle. The configuration includes reducing the latency of the wireless transfer of frames or images by pipelining operations throughout the blocks involved in the wireless transfer. The latency of transfer is reduced to be as low as possible so that the frames are transferred seamlessly to the controller display, thus rendering a high quality of user experience.

As disclosed herein the aerial capture platform is designed and configured to capture images from an aerial vehicle perspective. For ease of discussion, reference herein will be made to images but it should be understood that such reference to images may include any media, e.g., video, still images, and/or audio, without limitation. The aerial capture platform configuration allows for a content creation platform that can be integrated with other camera and camera-related systems and ecosystems, such as activity cameras (e.g., a GOPRO HERO camera) and their ecosystems.

The remote controller of the aerial capture platform can be configured for use in operating the aerial vehicle. The remote controller can be a dedicated mobile computing device or another mobile computing device, for example, a smartphone, a tablet, notebook computer, etc. By way of example, a dedicated remote controller can be configured to include a visual screen (e.g., liquid crystal display or plasma). In addition, the remote controller can include mechanical and/or solid state control elements, e.g. a joystick, touchpad, etc. The remote controller itself can be portable and contained within a casing (or housing). For example, the remote controller may include two parts, such as a display portion and control portion that fold into each other. An antenna system can be configured within the casing of the remote controller to further enhance portability. The remote controller can be primarily dedicated for use with the aerial vehicle and can include its own operating system (e.g., an ANDROID based OS).

Example System Configuration

The descriptions herein are in the context of a remote controlled aerial vehicle, for example, a rotary wing (or rotary blade) or fixed wing aircraft. However, disclosed configurations may apply to other remote controlled vehicles such as boats and cars. In addition, the remote controlled vehicles may have hobby sized form factors. As noted above remote control aerial vehicles may sometimes be referred to as unmanned aerial vehicles or drones and in this context may include camera units/hardware for capturing images.

Turning now to FIG. 1, it illustrates an example aerial capture platform (or system) 100. The aerial capture platform 100 may include a remote controlled aerial vehicle 110 in communication with a remote controller 120. The aerial vehicle 110 and the remote controller 120 are communicatively coupled through a wireless link 125. The wireless link 125 can be a Wi-Fi link, cellular (e.g., long term evolution (LTE), 3G, 4G, 5G) or other wireless communication link. In this example of the aerial capture platform 100, the aerial vehicle 110 can be, for example, a quadcopter or other multi-rotary blade aerial vehicle. Also in this example, the remote controller 120 is illustrated as a dedicated remote controller, but the principles described herein can apply to other devices that may operate as a remote controller, for example, a smartphone, tablet, a laptop, etc.

The aerial vehicle 110 in this example includes a housing (or body) 130, a gimbal 210, two or more arms 135, and two or more propellers 140. The housing 130 has one or more cavities for a payload. The payload can include, for example, electronic circuitry (including, e.g., controls and processing components), battery, sensors, etc. The payload may include mechanism such as a parachute. The parachute may be in a portion of the housing that can open so that the parachute can deploy in certain pre-determined situations. The parachute and/or corresponding portion of the housing 130 may couple with electronics that can provide the logic for deployment of the parachute. The housing 130 may include a communication subsystem (which may include corresponding electronics and/or firmware) and a control subsystem (which may include corresponding electronics and/or firmware). The communication subsystem may be used to wirelessly communicate with a remote controller, e.g., 120, or other interfaces on the aerial vehicle 110. The control subsystem may be configured to control operations of various systems on the aerial vehicle 110 such as the power system, the flight operation system and other such system. The communication subsystem and the control subsystem are described further in detail with respect to FIG. 3.

The gimbal 210 may be a removable structure. For example, the gimbal 210 may removably (or releasably) mount within an opening on the housing 130 of the aerial vehicle 110. Further by example, when removed from the aerial vehicle 110, the gimbal 210 may be mounted on another structure, for example, a pole mount. The gimbal 210 may couple with a removable camera frame. Alternately, the gimbal 210 may be integrated with the housing 130. The gimbal 210 also may include a camera secured directly with it or through the camera frame. The camera frame can be removed and fitted for the particular camera that couples with it. Alternately, the camera frame may be integrated with the gimbal.

Each arm 135 of the aerial vehicle 110 can removably couple with the housing 130. In addition, each arm 135 includes a thrust motor 240 (which may include a rotor) that can mechanically, and removably, couple with a propeller 140 to create a rotary assembly. When the rotary assembly is operational, all the propellers 140 spin at appropriate directions and/or speeds to allow the aerial vehicle 110 to lift (take off), tilt, turn, land, hover, and/or otherwise move (up, down, forward, reverse (or backward), etc.) in flight.

The aerial vehicle 110, including gimbal 210, and remote controller 120 are further described herein. Also described are some example operational configurations for each.

Remote Controlled Aerial Vehicle

Beginning with the remote controlled aerial vehicle 110, reference is now made to FIGS. 2A-2E. By way of example, at a high level the aerial vehicle 110 may include the housing 130, arms 135, thrust motors 240, propellers 270 and landing gear 272.

In the example of the aerial vehicle 110, the arms 135 couple with the housing 130. A thrust motor 240 couples with each end of an arm 130, and this may form an arm assembly. Further, a propeller 270 may couple with each thrust motor 240. The thrust motor 240, when coupled with the propeller 140 (shown in FIG. 2B), spins the propeller in an appropriate direction when the thrust motor 240 is operational.

The arms 135 are configured so they can pivot about their connection point at the housing 130. For example, the arms 135 can be extended away from the housing for purposes of flight and can be folded back so the arms are close to the housing 130, for example, for storage or transport (e.g., as shown in FIG. 2C). In addition, each of the arms 135 is removably coupled with the housing 130 so that they can be removed and/or replaced, for example, in the event of wear, breakage, structural compromise, or new designs. In addition, propellers 270 that couple to motors 240 on the end of each arm 135 are removable also, for example, for storage and/or replacement. Additionally, the arms 135 may incorporate connection electronics (e.g., electrical/electronic circuitry and/or components) and/or mechanical structures to extend or fold the arms automatically.

In example embodiments in which the arms 135 rotatably couple the housing 130 of the aerial vehicle, there may be a sensor and/or connection to a sensor (or sensor system) that may be used to determine if the arms 135 are in a closed position or in an open and locked position (e.g., for flight of the aerial vehicle 110). If the aerial vehicle 110 is preparing to fly and any one arm is not properly in an open, locked position, a notification may be generated. Examples of notification include powering a light emitting diode (LED) that may be a warning light, generating an audible signal (e.g., a beep, an alarm or voice notification) or transmitting a message to another device (e.g., the remote controller). In some embodiments, power to the motors of the arm (or arms) that is not properly open and locked may be cut off (disabled). In some embodiments control signals received from the remote controller may be disabled.

The housing 130 of the aerial vehicle 110 can be configured to be waterproof to reduce and/or eliminate water or dust from entering the internal cavity of the housing 130 where electrical components are housed. For example, rubber gaskets can be structured around locations such as where the arm 135 connects with the housing 130 or moves to fold against the housing. Moreover, the aerial vehicle 110 is configured to allow incorporation of, or couple with, float structures made of, for example, removable foam, fiberglass, balloon, or other material that is structured to allow the aerial vehicle 110 to float in the event of a water landing. A further example of a foam floatation structure may be dense foam that enables floatation on water and may be wrapped around or substantially around an arm of the aerial vehicle 110 and/or the housing of the aerial vehicle 110. A further example of a balloon floatation structure may include having the balloon within an arm or around an arm of the aerial vehicle. The balloon may be coupled with an air assembly, e.g., compressed air cartridge. The air assembly may be configured to inflate the balloon upon a signal from an external source, e.g., the remote controller 120, configured to trigger (or activation) a switch to release the air from the compressed air cartridge into the balloon. Alternately, the air assembly may be configured to inflate the balloon or upon a sensor on the aerial vehicle 110 detecting water and triggering (or activating) the switch to release the air from the compressed air cartridge into the balloon.

The float structures, in addition to being removably coupled with the housing 130, also are configured to be aerodynamic to reduce wind drag during flight. Further, the arms 135 also may include optional removable floatation structures that assist with overall buoyancy of the aerial vehicle 110 in the event of a water landing or independently can float if they separate on from the housing 130 and land on water.

Figure 2A:
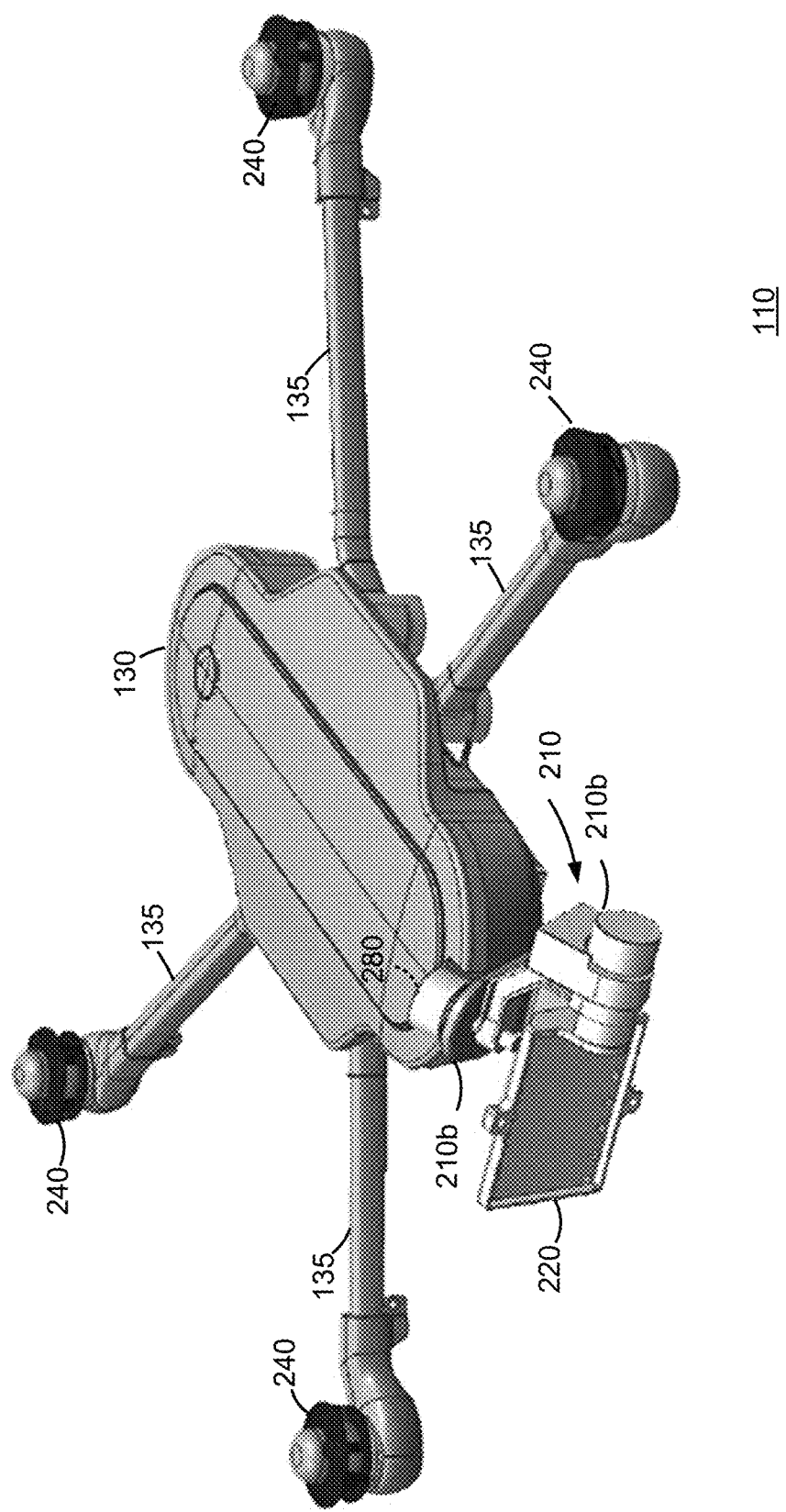
FIG. 2A illustrates an example of a remote controlled aerial vehicle.
Figure 2B:
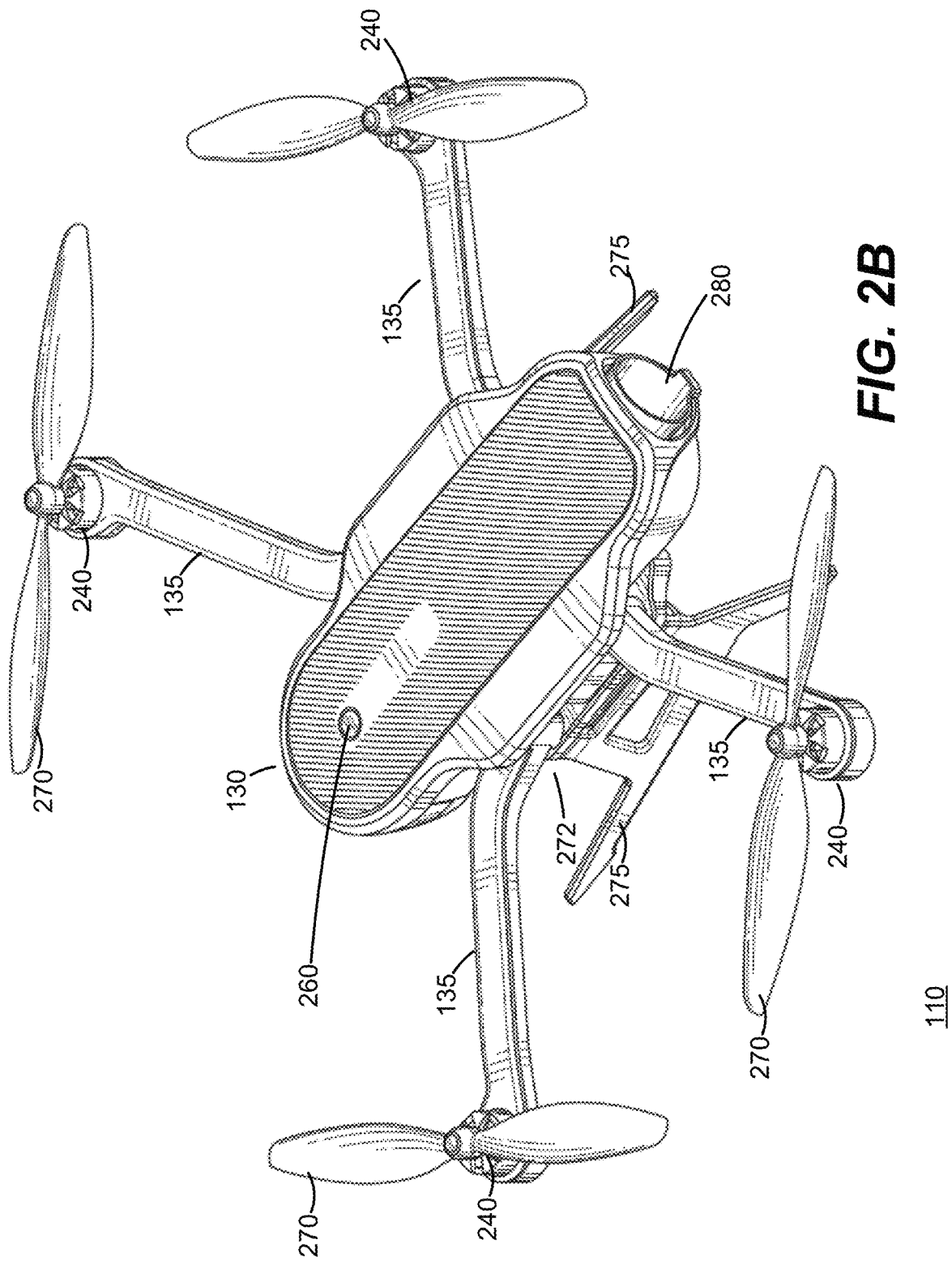
FIG. 2B illustrates an example of an aerial vehicle in an open position.
Figure 2C:
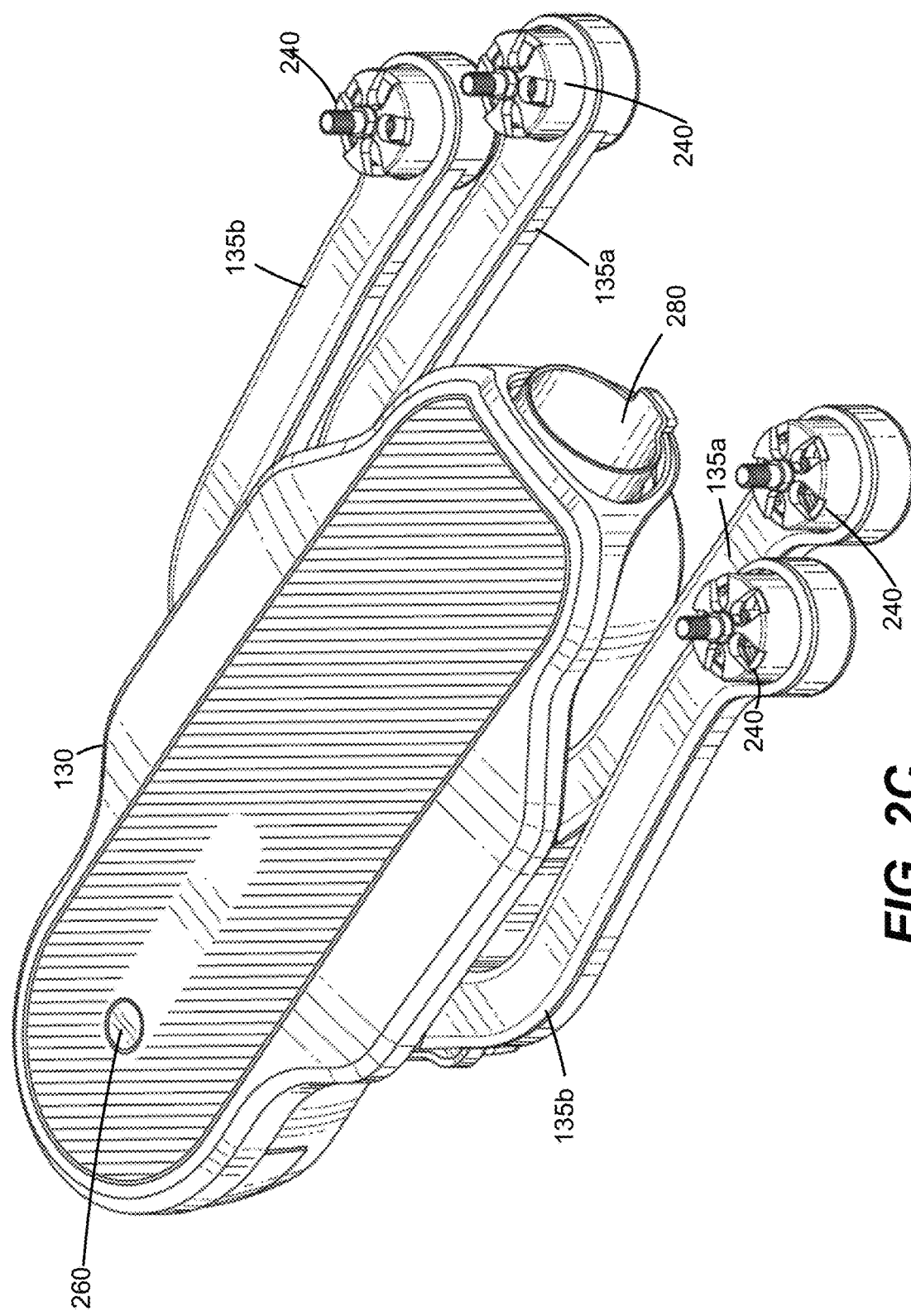
FIG. 2C illustrates an example of an aerial vehicle in a closed position.

Turning now to further descriptions of configurations of the aerial vehicle 110, FIG. 2B illustrates an example of the aerial vehicle 110 in an open position (or state). This example embodiment of the aerial vehicle 110 illustrates the housing 130, removably foldable arms 135, removable landing gear 272 (further described below), and the rotors 240. Also shown is a start button 260 along a top of the housing 130. The start button 260 can be used to place the aerial vehicle 110 in different operating states—e.g., ON, OFF, or STANDBY. Also shown is a gimbal opening 28 that is described further.

FIG. 2C illustrates an example of the aerial vehicle 110 in a closed (folded) position (or state) and the propellers 270 removed. In the closed position illustrated, the landing gear 275 can be folded under the housing 130 and/or decoupled from the housing 130, e.g., for separate storage. Further, propellers 270 have been decoupled from the motors 240, e.g., for separate storage. In addition, the arms 135 are shown folded against the housing 130 of the aerial vehicle 110. In this example, the structural elements of the arms 135 help enhance portability of the aerial vehicle 110 in a closed position by providing a compact footprint. For example, the arms on the same side couple with the housing 130 such that when the arms are folded they are in a nested position relative to each other with rear arms substantially parallel with the front arms. Continuing with the example, a first set of arms (e.g., front arms) 135a may have a lower elevational plane (e.g., "z-axis" plane) than a second set of arms (e.g., rear arms) 135b, as further illustrated with FIGS. 2D and 2E, or vice versa. This offset can further help create a compact footprint in the closed position as at least a portion of the second arm may overlap with a portion of the first arm on its respective side in the nested position.

FIG. 2D and FIG. 2E illustrate additional views of the aerial vehicle 110. FIG. 2D illustrates a first end view, e.g., where the gimbal opening 280 is located. FIG. 2E illustrates a second end view, e.g., opposite end of where the gimbal opening 280 (e.g., gimbal attachment mechanism) is located. The gimbal opening 280 is further described below.

In FIGS. 2D and 2E, the first set of arms 135a are shown to be in a lower elevational plane (e.g., "z-axis" plane) along a portion of the arm than the second set of arms 135b, which are in a higher elevational plane. As previously noted, this configuration helps allow the arms (generally 135) to be closer to the housing 130 when the arms are rotated into a folding position, as further shown in FIG. 2C. Moreover, as each arm 135 can be a unibody construction. Unibody construction can help maintain structural rigidity and integrity by limiting potential break points while still providing a compact footprint.

The aerial vehicle 110 also includes removable landing gear 272. The landing gear 272 can have two or more legs 275 (or arms). The legs 275 are what the aerial vehicle 110 rests upon when on the ground, e.g., prior to flight, at landing, etc. The landing gear 272 may be removably coupled with a bottom of the housing 130. In addition, the legs 275 of the landing gear 272 can be folded flush or substantially flush against the bottom of the housing 130.

FIGS. 2D and 2E illustrate the landing gear 272. The landing gear 272 includes two pivot points 278 about which the legs 275 rotate to fold inward toward the bottom of the housing 130. The landing gear 272 can be configured so that it fits within a recessed cavity of an underside, or bottom, of the housing 130. The recessed cavity can allow the legs 275 in the folded position to be substantially flush with the bottom of the housing 130 to further enhance portability by tucking the legs 275 within the overall aerial vehicle 110 volumetric footprint rather than having them remain apart from bottom of the housing 130 of the aerial vehicle 110. The legs 275 of the landing gear 272 may be removable from the rest of the landing gear 272. The legs 275 may be removed, for example, for storage, and/or replaced as needed, e.g., due to wear, tear, structural compromise, or updated structural configuration.

The landing gear 272 and/or its legs 275 may include optional removable flotation structures (e.g., foam or balloon) that assist with overall buoyancy of the aerial vehicle 110 in the event of a water landing or independently can float if they separate from the housing 130 and land on water. Moreover the landing gear 272, including the legs 275, may be made of a structurally rigid, yet buoyant material that can hold the weight of the aerial vehicle 110 when on the ground resting, and help with floatation in the event of a water landing.

The landing gear 272 may incorporate electronics and/or mechanical structures to extend and retract the legs 275 of the landing gear automatically. The electronics may have electrical connection points where the landing gear 272 can couple with the bottom of the housing. By way of example, the electronics may control the pivot points 278 to retract the foldable legs 275 toward a bottom of the housing 130 or extend away from the bottom of the housing 130. By way of operational example, when the aerial vehicle 110 is at a predetermined distance from the ground (e.g., as detected from a proximity sensor on the aerial vehicle), the legs may be retracted during ascent (or lift off). When the aerial vehicle 110 is descending to land, when the aerial vehicle reaches a predetermined distance from the ground, the legs may be extended. Alternately, or in addition, the remote controller 120 may be used to transmit control signals to the aerial vehicle 110 to retract or extend the legs 275 of the landing gear 272.

Removable Gimbal

Referring back to FIGS. 2A-2D, shown is the previously introduced gimbal opening 280, which is integrated with the example embodiment of the aerial vehicle 110. The gimbal opening 280 may be configured to receive a gimbal 210. The gimbal opening 280 comprises a cavity that may include a releasable lock mechanism to receive an end of a gimbal 210 and securely connect (or couple) it relative to the aerial vehicle 110. The coupling is such that the gimbal 210 can remain fixedly connected during flight. As the lock is releasable, the gimbal 210 can be disconnected (or decoupled) from the aerial vehicle 110 when desired. A portion of the gimbal opening 280 against the housing 130 may be sealed with a rubber gasket to assist with creating a water and/or dust barrier.

The gimbal 210, when connected with the gimbal opening 280, may be configured to allow for rotation of an object about an axis. The object in one example may be a camera mount 220. The gimbal 210 allows for the camera mount 220 to maintain a particular position so that the camera mounted to it can assist with providing image stability and a consistent horizon view (a horizontal plane as may be predefined or defined by a user) or view relative to the horizon as the aerial vehicle 110 is in flight. The camera mount 220 may be, for example, a plate or a frame. In addition to allowing a camera (not shown in FIG. 2A) to couple (e.g., attach) to it, the camera mount 220 may include electrical connection points for the coupled camera. The electrical connection points can be used to power the camera and/or communicate signals between the camera and the gimbal 210 and/or components of the aerial vehicle 110.

The gimbal 210 can, in some example embodiments, be an electronic three-axis gimbal which rotates a mounted object (e.g., camera mount 220, which may be a detachable camera frame connected to a camera) in space. Each axis of the gimbal 210 includes a motor (e.g., 210a, 210b) to control rotation. The gimbal 210 may include an electrical connection with a power subsystem of the aerial vehicle 110 to power the motors (e.g., 210a, 210b) or may include its own battery power supply. The gimbal may include connection electronics to provide part of an electronic connection between the camera and the aerial vehicle 110. The gimbal may include a sensor unit and a control logic unit, both of which are part of a gimbal control system. The gimbal control system can detect the orientation of the gimbal 100 and camera, determine a preferred orientation of the camera, and control the motors of the gimbal in order to re-orient the camera to the preferred position.

A sensor unit within the gimbal can include an inertial measurement unit (IMU) which measures rotation, orientation, and acceleration using sensors, such as accelerometers, gyroscopes, and magnetometers. The sensor unit can contain rotary encoders, which detect the angular position of the motors of the gimbal 210, and a magnetometer to detect a magnetic field, such as the earth's magnetic field. In some embodiments, the sensors of the sensor unit are placed such as to provide location diversity. For example, a set of accelerometers and gyroscopes can be located near the camera (e.g., near the connection to the detachable camera frame) and a set of accelerometers and gyroscopes can be placed at the opposite end of the gimbal (e.g., near the connection to the aerial vehicle 110). The outputs of these two sets of sensors can be used by the IMU to calculate the orientation and rotational acceleration of the camera, which can then be output to the gimbal control logic. In some embodiments, the sensor unit is located on the aerial vehicle 110. In some embodiments, the gimbal control logic receives data from sensors (e.g., an IMU) on the aerial vehicle 110 and from the sensor unit of the gimbal 210.

In one embodiment, the gimbal 210 is removable from the camera mount 220 and structured for use with other devices, for example, a mount platform such as a tripod, a handheld grip, or an intelligent base. A mount platform also can removably couple with the gimbal 210. By way of example, the mount platform (e.g., handheld grip) can include a plurality of buttons, which can be used by a user to control the camera and/or the gimbal 210. Note that some mount platforms, e.g., handheld grip, may contain a battery from which it can provide power to the gimbal 210 and may also be used to power and/or charge the camera in addition to operating any electronic functions on the handheld grip itself. It is noted that the mount platform can have controls and circuitry for wireless communication with other computing devices.

Remote Controller

Referring next to the remote controller 120, FIGS. 2F to 2I illustrate one example embodiment of the remote controller 120. The remote controller 120 in this example includes a first control panel 150 and a second control panel 155, an ignition button 160, a return button 165 and a display 170. It is noted that more or less control features and buttons may be included. In this example, the remote controller 120 can be used to control operation of the aerial vehicle 110. This operation can include pitch, roll and yaw control for the aerial vehicle 110 in addition to other functions.

Continuing with the example, the control panels 150, 155 can be used by a user to initiate control operations. The control panels can be mechanical (e.g., joystick, roller ball, etc.) or solid state (e.g., touch pad). For example, a first control panel 150 can be used to control vertical direction (e.g. lift and landing) of the aerial vehicle 110. A second control panel 155 can be used to control horizontal (e.g., thrust/drag) direction of the aerial vehicle 110. In addition, a combination of the panels 150, 155 with another controller mechanism, e.g., a wheel, can be used for "left-right" and/or hover movement. It is noted that these are just examples and that the controllers can be assigned other or different functions.

The ignition button 160 can be used to remotely turn on and/or start (as well as turn off or pause operation of) the aerial vehicle 110 components. For example, a single press of the ignition button 160 may start operation of a first set of components, e.g., sensors and lighting, on the aerial vehicle 110 and a second press may start operation of a second set of components, e.g., the rotary assembly (e.g., start the propellers 140), on the aerial vehicle 110. The return to home (RTH) (or come home) button 165 can be used to override the controls of the remote controller 120 and transmit instructions to the aerial vehicle 110 to return to a predefined location. Examples of a return to home configuration as a part of a return path will be described further below.

The ignition button 160 and the return button 165 can be mechanical and/or solid state press sensitive buttons. In addition, each button 160, 165 may be illuminated with one or more light emitting diodes (LED) to provide additional details. For example, the LED can switch from one visual state to another to indicate with respect to the ignition button 160 whether the aerial vehicle 110 is ready to fly (e.g., lit green) or not (e.g., lit red). The LED also can provide visual indicators corresponding to aerial vehicle 110 operation in flight, for example, if it is in an override mode on return path (e.g., lit yellow) or has a battery power level below a predefined threshold (e.g., lit green when above a first threshold, lit yellow when just below that threshold, and lit red below a lower threshold). It also is noted that the remote controller 120 may include other dedicated hardware buttons and/or switches and those buttons and switches may be mechanical and/or solid state buttons and switches. For example, another button may be added to transmit signals/instructions to the aerial vehicle 110 to deploy the parachute.

The remote controller 120 may include dedicated buttons corresponding to functions on the remote controlled aerial vehicle 110, for example, a camera shutter button for signaling (or triggering) taking still or video images, changing image capture resolution, changing frame rate, etc. Other buttons can be used for functions such as camera controls, including control settings, for example, tagging images, transmitting (or sharing) captured images, etc.

The remote controller 120 may include a screen (or display) 170. The screen 170 provides for visual display. The screen 170 can be a touch sensitive screen. The screen 170 can be, for example, a liquid crystal display (LCD), an LED display, an organic LED (OLED) display, or a plasma screen, etc. The screen 170 allows for display of information related to the remote controller 120, for example, menus for configuring the controller 120 and/or remotely configuring the aerial vehicle 110, and/or controlling a camera and/or gimbal 210 coupled with the aerial vehicle 110. The screen 170 can display images captured from a camera coupled with the aerial vehicle 110.

The remote controller 120 in this example includes a two-part casing (or housing) that may be coupled via pivot points 291. The pivot points 291 may be a mechanical hinge. For example, a first part casing (or first casing) may include the screen 170. Further by example, a second part casing (or second casing) may include the control panels 150, 155, buttons 160, 165 and a speaker 293. Each casing may include a cavity to house electronics and/or sensors for the components noted. Within either or both portions of the casing there may be an internal antenna. The antenna also may be configured external to the casing or a combination of internal and external.

In the example configurations of FIGS. 2F and 2G, illustrated is the remote controller 120 in an open position. This example remote controller 120 shows a power button 290, pivot points 291, wheel 292 and a speaker 293. Here, the casing is illustrated in two portions, one with the screen 170 and one with the other components such as the control panels 150, 155, buttons 160, 165 and the speaker 283. Each in this example is individually enclosed. The two parts of the casing are coupled through pivot points 291. The pivot points 291 are points or ends about which the first casing having the screen 170 rotates to cover the second casing to form a "closed" state of the remote controller 120, as shown in FIG. 2H and 2I.

In these example illustrations of the remote controller 120, the shown power button 290 may powers the remote controller 120 in an ON, OFF, or STANDBY state. The wheel 292 can be provide assigned functionality, for example, fine movements, "left or right" and/or hover movements. The speaker 293 may be used for audio playback through the remote controller 120. FIGS. 2H and 2I illustrate an example remote controller 120 in a closed position. FIG. 2I in particular also illustrates, by way of example, an additional switch 294, which can be assigned functionality, including, for example, power state, or locking, etc.

Figure 3:
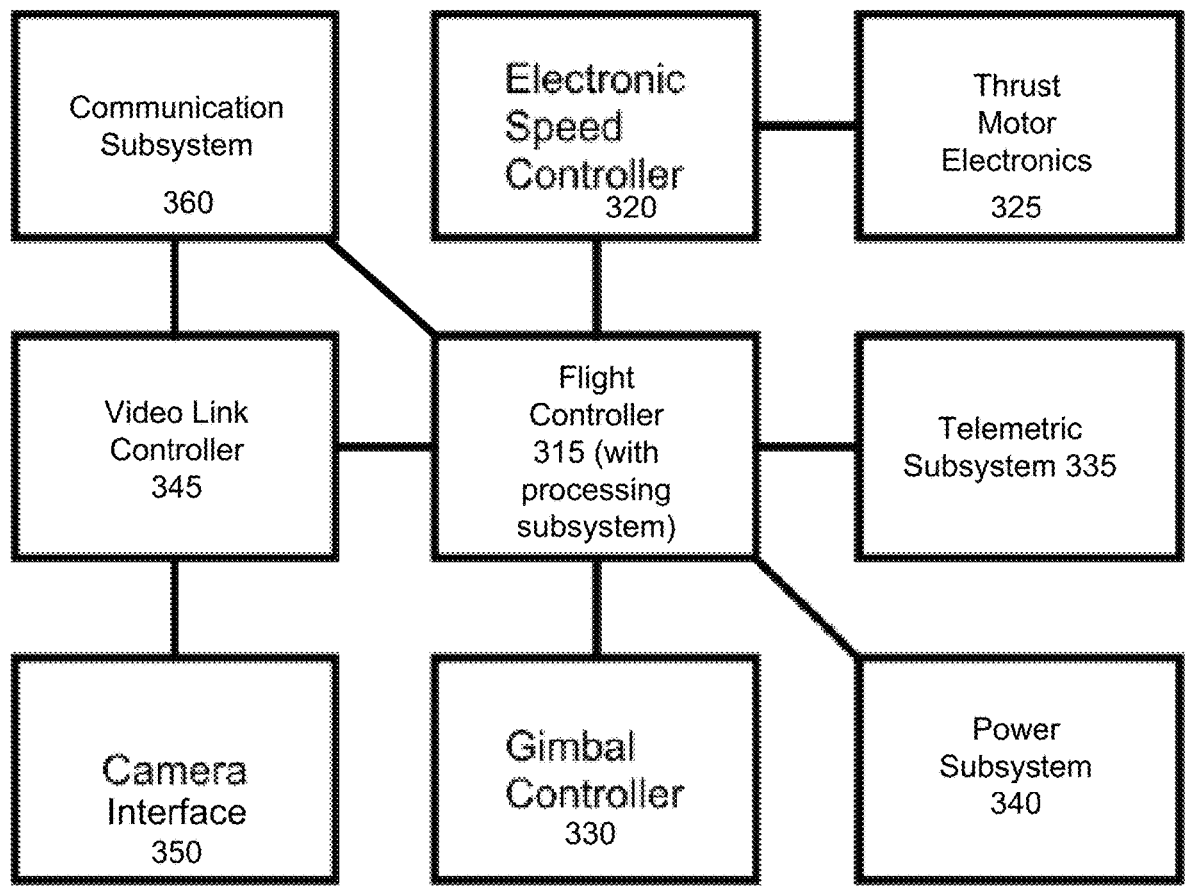
FIG. 3 illustrates an example of a remote controlled aerial vehicle electronics and control systems.

FIG. 3 illustrates an example embodiment of an electronics and control (EC) system 310 of the aerial vehicle 110. The example EC system 310 may include a flight controller 315, an electronic speed controller (ESC) 320, one or more thrust motors electronics 325, a gimbal controller 330, a sensor subsystem (which may include telemetric subsystems) 335, a power subsystem 340, an image link controller 345, a camera interface 350, and a long range communication subsystem 360. The components communicate directly or indirectly with each other through a data bus within the aerial vehicle 110.

Figure 14:
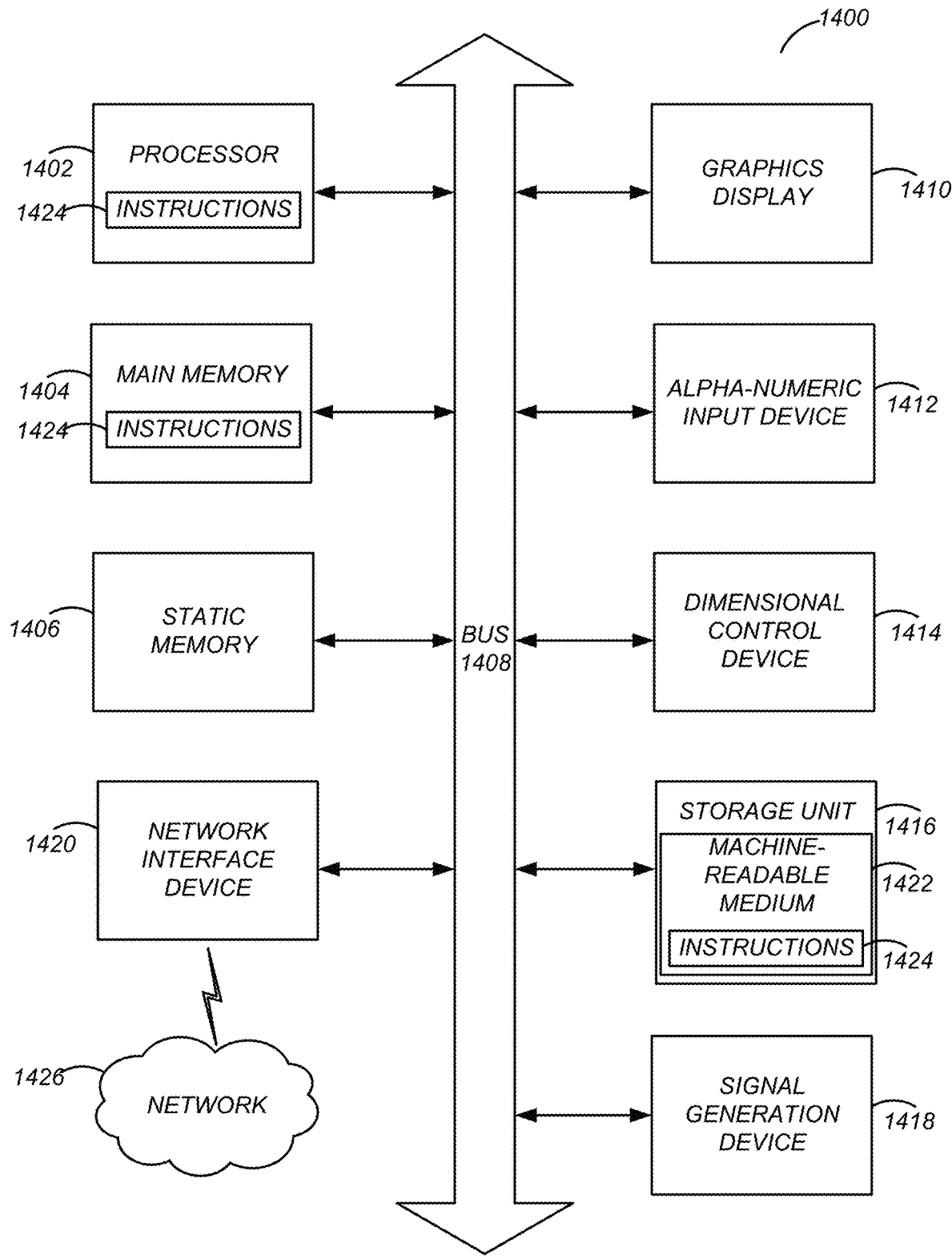
FIG. 14 illustrates an example machine for use with a system of the remote controlled aerial vehicle.

The aerial vehicle 110 components may be embodied in hardware, software, or a combination thereof. The software, which can include firmware, may be referenced as program code, computer program product, or program instructions, and may be comprised of one or more instructions. Software may include an operating system, which provides an interface to a processor, and on which software applications run (or execute). Software can be executed by one or more processors within the aerial vehicle 110. A processor also may include, for example, controllers, application specific integrated circuits (ASICs) and/or field programmable gate arrays (FPGAs). The processor can be configured to execute the software in a specific manner. FIG. 14 provides an example machine architecture with a processor that can be configured to execute software. It is noted that not all the components of FIG. 14 may be included in the aerial vehicle 110. FIG. 14 is intended to be illustrative in describing an architecture of a computing system, of which all or parts can operate within the aerial vehicle 110 and the EC system 310.

In this example, the aerial vehicle 110 may be configured to include an aerial vehicle operating system (AVOS). By way of example, the AVOS can be built on an operating system kernel, for example, LINUX, and/or be based on an operating system such as ANDROID OS. The software components of aerial vehicle described in the disclosure operate with the AVOS. Examples of these software configurations are found throughout this disclosure.

Turning now to the example components of the EC system 310, a further description of each component is provided. In one example embodiment, the flight controller 315 of the EC system 310 coordinates and processes software for the aerial vehicle 110. The flight controller 315 may integrate the AVOS. Examples of processing directed by the flight controller 315 include coordinating communication with the remote controller 120 through the communication subsystem 360 and processing commands to and from the remote controller 120. The flight controller 315 also may control flight related operations of the aerial vehicle 110 by control over the other components such as the electronic speed controller 320 and the sensor subsystem 335. The flight controller 315 also interfaces with the gimbal control 330 to assist with controlling the gimbal motors of the gimbal 210. In addition, the flight controller 315 may be used to assist with the image link 345 for camera control operations.

Referring now to the electronic speed controller 320, it is configured to interface with the thrust motors electronics 325. The electronic speed controller 320 may be configured to control, via the thrust motors electronics 325, the speed applied by the thrust motors 240 to the propellers 140. The electronic speed controller 320 may control each thrust motor 240 through the thrust motors electronics 325 individually or in groups or subgroups. It is noted that the thrust motors electronics 325 may be integrated with the thrust motors 240.

Next, the gimbal controller 330 may include control electronics (and may include firmware) that may be configured to control operation of the motors for each axis of the gimbal. The gimbal controller 330 receives commands via the flight controller 315. The commands may originate from the remote controller 120, which passes them to the flight controller 315 via the communication subsystem 360.

Turning next to the image link controller 345, it is configured to communicate with the camera interface 345 to transmit commands that can include capture of images from a camera for transmission to the remote controller 120 (and/or other device with screen such as a smart phone or tablet), e.g., via the communication subsystem 360. The images may be overlaid and/or augmented with other data from the aerial vehicle such as the sensor data from the sensor subsystem 335. When images are sent to both the remote controller 120 and another device, the overlaid information may be the same on each device or distinct on each device. It is noted that the image link controller 345 may have a processing configuration that allows commands to be directly transmitted between the communication subsystem 360 and the camera interface 350. Alternately, or in addition, the image link controller 345 may communicate with the flight controller 315 for processing resources and application of software configurations.

The camera interface 350 may be configured to receive camera control commands from the image link controller 345. The camera commands can include commands to set up camera operations, e.g., frame capture rate, still or video images, etc. The camera commands may originate from the remote controller 120 and be received via the communication subsystem 360 and image link controller 345 of the EC system 310.

Turning next to the sensor subsystem 335, it may include one or more sensors. Each set of sensors may be further grouped as sensor modules to gather particular types of data. For example, one sensor module may be for positional sensors and another sensor module may be for environmental sensors. Positional sensors can provide location and/or relative location in space and orientation information of the aerial vehicle 110. Positional sensors can assist with navigation and location related operations of the aerial vehicle 110. Positional sensors can include, for example, a gyroscope, accelerometer, a compass, a global positioning system (GPS) sensor, a motion sensor, and/or an altimeter. Environmental sensors can provide information of a particular environment. For example, environmental sensors can provide information on environmental conditions external to the housing 130 of the aerial vehicle 110. Further by example, environmental sensors can provide information on conditions within the housing 130 of the aerial vehicle 110. Environmental sensors can include, for example, a temperature sensor, a photo detector, a heat sensor, a moisture sensor, and/or a barometric sensor. It is noted that in some example instances an environmental sensor can also operate as a positional sensor for purposes of how the data may be used and vice versa. For example, a photo detector may be used to determine time of day for a flight, but also can be used to detect shadows for avoidance detection during flight of the aerial vehicle 110. Similarly by way of example, a barometric sensor may be used to determine atmospheric pressure and aerial vehicle 110 altitude. Note that other sensor configurations also may be included in addition to the examples given.

The sensor data from the sensor subsystem 335 may comprise sensor metadata and can be integrated with images and/or metadata from a camera. The images from the camera, which may also include additional metadata, can be transmitted wirelessly to other devices and/or stored for later playback. When the images are displayed (e.g., played in real time or from storage), the sensor data can be extracted from it and provided for display on a screen, e.g., the screen 170 of the remote controller 120 or a screen of a computing device (e.g., laptop, smartphone, tablet, desktop computer, etc.). The camera interface 350 can interface with a camera or may include an integrated camera. The integrated camera would be positioned similar to the camera mount 220. Alternately, the camera may incorporate a camera mount.

The power subsystem 340 may be configured to manage and supply power to the components of the EC system 310. The power subsystem 340 can include a battery pack and a protection circuit module as well as a power control/battery management system. The battery can be replaceable and/or rechargeable. The battery of the power subsystem 340 can be configured to charge the camera in flight as needed or pre-flight. Other devices also may be charged using the energy capacity of the battery of the power subsystem 340, for example, the remote controller 120, a powered handheld grip, or a mobile phone. The battery also can be used to charge the camera, or other devices, post-flight, depending on energy remaining in the battery. Further, the power subsystem 340 can be configured to include a dual power path. A first path allows for a first power level, e.g., low current, to be used to power up the aerial vehicle 110 and its onboard components. Once components are powered the aerial vehicle 110 can transition to a second power level, e.g., high current, which is sufficient to consistently drive the thrust motors 240 and onboard components during flight. In addition, a regenerative charging configuration can be integrated into the power subsystem 340. For example, the power subsystem 340 can include a recharge circuit electrically coupled with the thrust motors 240 so that when the thrust motors 240 are decelerating, current is pushed back through the recharge circuit to charge the battery of the power subsystem 340.

The communication subsystem 360 may include communication electronics (and may include corresponding firmware) for the aerial vehicle 110. For example, the communication subsystem 360 can include a long range Wi-Fi system. It can include additional wireless communication components. For example, it may include another Wi-Fi system, which may allow for one Wi-Fi system to be dedicated to direct control communications with the remote controller 120 and the other Wi-Fi system may be used for other communications, such as image transmissions). It can include a communication system such as one based on long term evolution (LTE), 3G, 4G, 5G or other mobile communication standard. The communication subsystem 360 may be configured with a uni-directional remote control channel for communication of controls from the remote controller 120 to the aerial vehicle 110 and a separate unidirectional channel for an image downlink from the aerial vehicle 110 to the remote controller 120 (or to a video receiver where direct image connection may be desired). The communication subsystem 360 can be used to allow for other services, for example, to provide over the air or hardwire link updates, such as firmware updates to the aerial vehicle 110. Some third-party services may be provided access to the communication subsystem 360 or components within via application programming interfaces (API).

Example Interconnect Architecture for Aerial Vehicle

Figure 4:
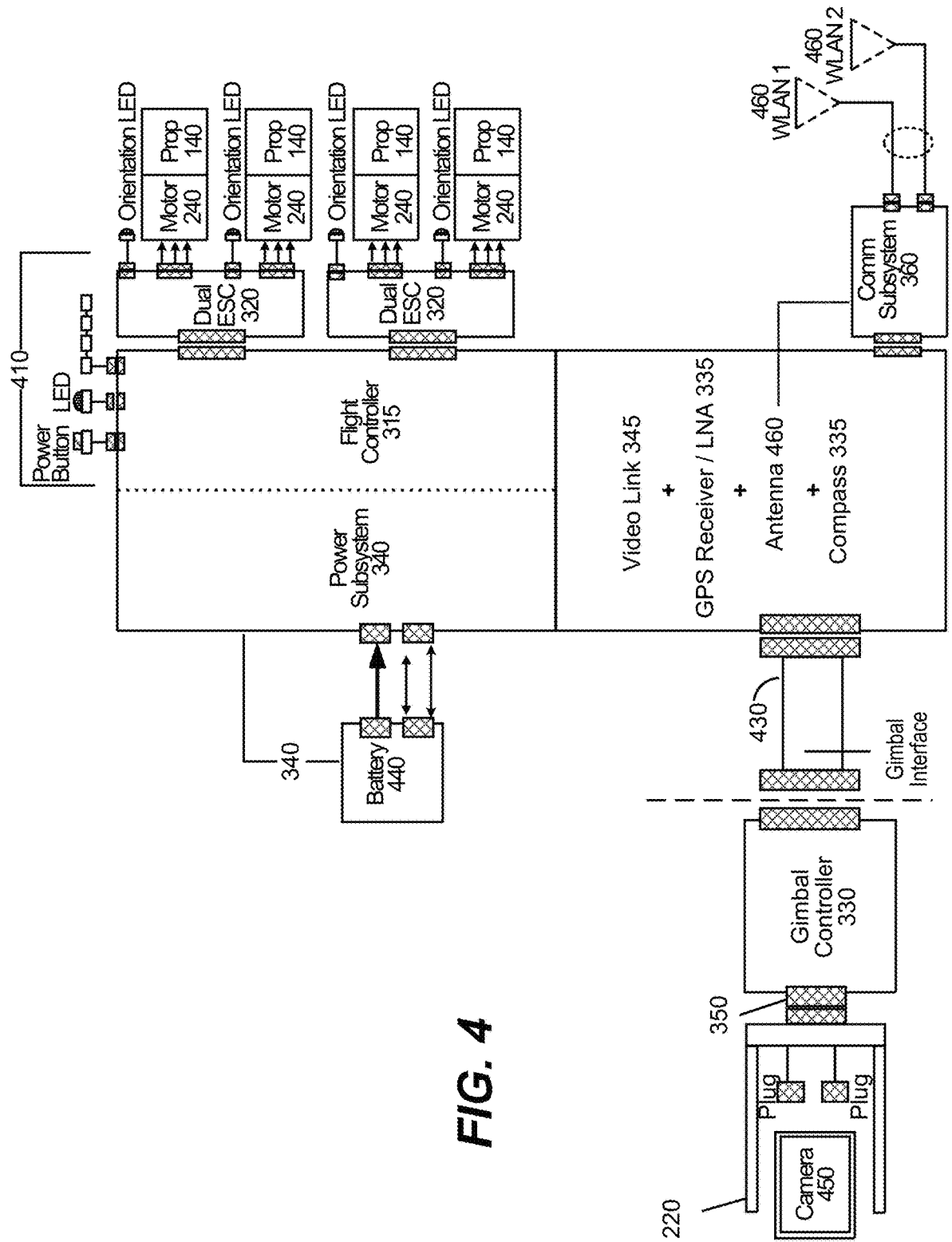
FIG. 4 illustrates an example interconnect architecture of a remote controlled aerial vehicle with a gimbal.

Turning to FIG. 4, it illustrates an example interconnect architecture of the remote controlled aerial vehicle 110 with the gimbal 220. This example embodiment includes the components illustrated and described in the prior figures, e.g., FIG. 3. In addition, there are shown additional components such as LEDs 410 on the aerial vehicle 110 that can be used to provide information, e.g., vehicle status related information. Also shown is a battery 440 as a part of the power subsystem 340. The battery 440 provides direct current power and may be rechargeable. Also illustrated is an antenna 460, which may be part of the communication subsystem 360.

In addition, the figure illustrates an example embodiment in which the flight controller 315 is coupled with two electronic speed controllers 320. Each electronic speed controller 320 in this configuration drives two thrust motors 240, for example, through the thrust motors electronics 325 (not shown).

Also shown is a gimbal interface 430 that can couple the gimbal controller 330 with components of the EC system 310. In particular, the gimbal interface 430 is communicatively coupled with the image link controller 345, the sensor subsystem 335 (e.g., GPS, compass, etc.), and the antenna 460. The gimbal interface 430 is used to transmit this data to the gimbal controller 330. The gimbal controller 330 uses this data to adjust the camera mount 220. It is noted that the camera mount 220 can secure a camera 450.

The gimbal controller 330 is communicatively coupled with the camera 450 through one or more camera interface 350 connectors. The camera interface 350 connectors can include camera communication interfaces such as universal serial bus (USB) or HDMI. The images captured by the camera can be communicated (transmitted) back to the aerial vehicle 110 through the camera interface 350 connectors and gimbal interface 430. The transmission of the images may be at high (or full) resolution (e.g., uncompressed) or at a lower (or partial) resolution (e.g., compressed). Data, e.g., sensor data from the sensor subsystem 335, also can be sent via the camera interface 350 connectors to the camera 450 to associate with frames captured and stored on the camera 450.

Example Camera Architecture

Figure 5:
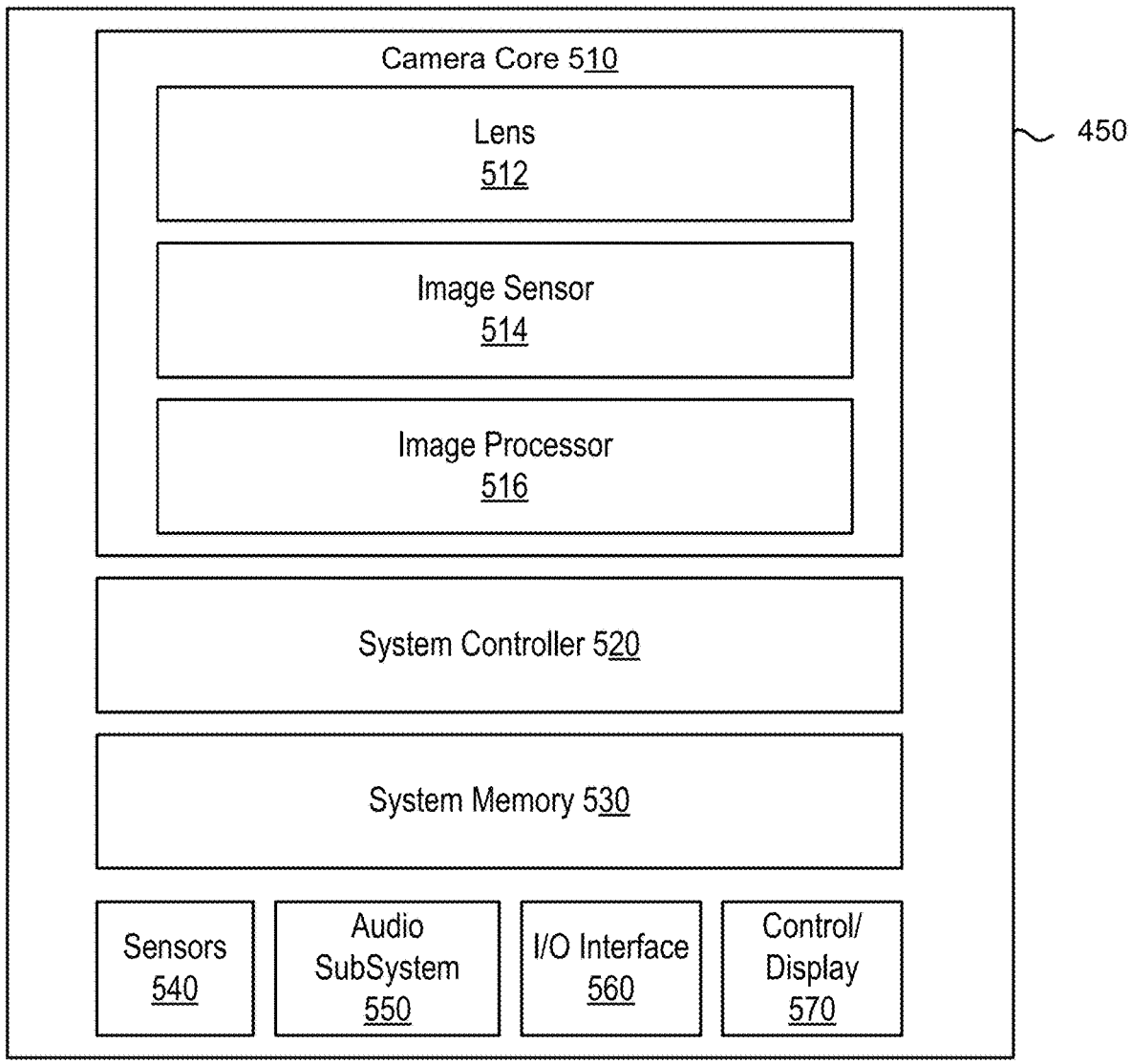
FIG. 5 illustrates a block diagram of example camera architecture.

FIG. 5 illustrates a block diagram of an example camera architecture 505. The example camera architecture 505 corresponds to an architecture for the camera, e.g., 450. It is noted that the camera 450 may be independent of or integrated with the aerial vehicle 110. When integrated with the aerial vehicle 110, the camera 450 may also be integrated with a gimbal, e.g., 210. Alternately, when independent, the camera 450 may be removably attached to the aerial vehicle 110. When removably attached, the camera 450 may be removably coupled to the gimbal 210 that couples the aerial vehicle 110. As previously noted, the gimbal 210 may be removably coupled with the aerial vehicle 110. Alternatively, the gimbal 210 may be integrated with the aerial vehicle 110. For ease of discussion, the camera 450 is described in a configuration where it is removably coupled with the gimbal 210 via a camera mount 220 and the gimbal 210 also is removably coupled with the aerial vehicle 110. However, the principles noted apply also in the instances in which the camera is integrated with the aerial vehicle 110.

Referring briefly to the camera 450 itself, it can include a camera body, one or more a camera lenses, various indicators on the camera body (such as LEDs, displays, and the like), various input mechanisms (such as buttons, switches, and touch-screen mechanisms), and electronics (e.g., imaging electronics, power electronics, metadata sensors, etc.) internal to the camera body for capturing images via the one or more lenses and/or performing other functions. In one embodiment, the camera 450 is capable of capturing spherical or substantially spherical content. As used herein, spherical content may include still images or video having spherical or substantially spherical field of view. For example, in one embodiment, the camera 450 captures video frames having a 360 degree field of view in the horizontal plane and a 180 degree field of view in the vertical plane. Alternatively, the camera 450 may capture substantially spherical images or video frames having less than 360 degrees in the horizontal direction and less than 180 degrees in the vertical direction (e.g., within 10% of the field of view associated with fully spherical content). In other embodiments, the camera 450 may capture frames having a non-spherical wide angle field of view.

As described in greater detail below, the camera 450 may include sensors to capture metadata associated with frame data, such as timing data, motion data, speed data, acceleration data, altitude data, GPS data, and the like. In one example embodiment, location and/or time centric metadata (geographic location, time, speed, etc.) can be incorporated into an image (or media) file together with the captured content in order to track over time the location of the camera 450 or the subject being recorded by the camera 450. This and sensor metadata may be captured by the camera 450 itself or by another device proximate to the camera 450 (e.g., a mobile phone, a data tracker worn by a subject (e.g., a smart watch or fitness tracker equipped with tracking software or a dedicated radio frequency tracker), the aerial vehicle 110 via the camera interface 350, etc.).

In one embodiment, the metadata may be incorporated with the content stream by the camera 450 as the content is being captured. In another embodiment, a metadata file separate from the image file may be captured (by the same capture device or a different capture device) and the two separate files can be combined or otherwise processed together in post-processing. It is noted that these sensors can be in addition to the sensors of the sensor subsystem 335. In embodiments in which the camera 450 is integrated with the aerial vehicle 110, the camera need not have (or need not operate) separate individual sensors, but rather could rely upon the sensors integrated with the aerial vehicle 110. The data captured by the sensors may be referenced as sensor metadata. The sensor metadata, as well as camera metadata from the camera 450, may be integrated with and/or used with aerial vehicle metadata captured from sensors on the aerial vehicle 110, for example, the environmental sensors, positional sensors, etc.

Referring now to the example camera architecture 505 of the camera 450, it may include a camera core 510 comprising a lens 512, an image sensor 514, and an image processor 516. The camera 450 also may include a system controller 520 (e.g., a microcontroller or microprocessor) that controls the operation and functionality of the camera 450 and system memory 530 configured to store executable computer instructions that, when executed by the system controller 520 and/or the image processors 516, perform the camera functionalities described herein. In some embodiments, a camera 450 may include multiple camera cores 510 to capture fields of view in different directions which may then be stitched together to form a cohesive image. For example, in an embodiment of a spherical camera system, the camera 450 may include two camera cores 510 each having a hemispherical or hyper hemispherical lens that each captures a hemispherical or hyper hemispherical field of view which is stitched together in post-processing to form a spherical image.

The lens 512 can be, for example, a wide angle lens, hemispherical, or hyper hemispherical lens that focuses light entering the lens to the image sensor 514 which captures frames. The image sensor 514 may capture high-definition images having a resolution of, for example, 720p, 1080p, 4k, or higher. In one embodiment, spherical images may be captured as a 5760 pixels by 2880 pixels with a 360 degree horizontal field of view and a 180 degree vertical field of view. For images, the image sensor 514 may capture images at frame rates of, for example, 30 frames per second, 60 frames per second, 120 frames per second or higher.

The image processor 516 can perform one or more image processing functions of the captured frames. For example, the image processor 516 may perform a Bayer transformation, demosaicing, noise reduction, image sharpening, image stabilization, rolling shutter artifact reduction, color space conversion, compression, or other in-camera processing functions. The image processor 516 also may be configured to perform real-time stitching of images, for example, when images are capture from two or more cameras coupled with the aerial vehicle 110 and configured to capture images. Such example configurations may include, for example, an activity camera (which may include a spherical image capture camera) that captures images, each with a substantially different field of view (FOV), but where there may be some overlap where the images can be stitched together. Processed images may be temporarily or persistently stored to system memory 530 and/or to a non-volatile storage, which may be in the form of internal storage or an external memory card, as shown and described in the example architecture of FIG. 4.

An input/output (I/O) interface 560 transmits and receives data from various external devices. For example, the I/O interface 560 may facilitate the receiving or transmitting image information through an I/O port. Control information, e.g., from/to a gimbal controller 330, also may be transmitted via the I/O interface 560. Examples of I/O ports or interfaces include USB ports, HDMI ports, Ethernet ports, audio ports, and the like. Furthermore, embodiments of the I/O interface 560 may include wireless ports that can accommodate wireless connections. Examples of wireless ports include BLUETOOTH, Wireless USB, Near Field Communication (NFC), and the like. The I/O interface 560 may also include an interface to synchronize the camera 450 with other cameras or with other external devices, such as a remote control, a second camera, a smartphone, a client device, or a video server. For example, a camera 450 mounted to an aerial vehicle 110 may be synchronized wirelessly (e.g., using time codes) with a camera on another aerial vehicle or on the ground so that frames captured by the various cameras can be synchronized.

A control/display subsystem 570 includes various control components associated with operation of the camera 450 including, for example, LED lights, a display, buttons, microphones, speakers, etc. The audio subsystem 550 includes, for example, one or more microphones and one or more audio processors to capture and process audio data correlated with frame capture. In one embodiment, the audio subsystem 550 includes a microphone array having two or microphones arranged to obtain directional audio signals.

Sensors 540 capture various metadata concurrently with, or separately from, image capture. For example, the sensors 540 may capture time-stamped location information based on a global positioning system (GPS) sensor. Other sensors 540 may be used to detect and capture orientation of the camera 450 including, for example, an orientation sensor, an accelerometer, a gyroscope, an altimeter, or a magnetometer. Sensor data captured from the various sensors 340 may be processed to generate other types of metadata. For example, sensor data from the accelerometer may be used to generate motion metadata, comprising velocity and/or acceleration vectors representative of motion of the camera 450. Furthermore, sensor data from the aerial vehicle 110 and/or the gimbal 210/gimbal controller 330 may be used to generate orientation metadata describing the orientation of the camera 450. Sensor data from the GPS sensor provides GPS coordinates identifying the location of the camera 450, and the altimeter measures the altitude of the camera 450. In one embodiment, the sensors 540 are rigidly coupled to the camera 450 such that any motion, orientation or change in location experienced by the camera 450 is also experienced by the sensors 540. The sensors 540 furthermore may associate one or more time stamps representing when the data was captured by each sensor. In one embodiment, the sensors 540 automatically begin collecting sensor metadata when the camera 450 begins recording a video. As noted previously, the sensor data from the camera architecture may be integrated with and/or used with sensor data from the aerial vehicle 110. It is noted that in example embodiments in which sensors of a particular type are missing from the aerial vehicle 110, the sensors 540 of the camera 450 can provide the requisite sensor data for appropriate processing operations.

As noted above, the camera 450 may also be controlled remotely, for example, through the remote controller 120, or through other devices in wireless communication with the camera, either directly or through the aerial vehicle 110. Accordingly, control functions of the camera 450 can be manipulated before, during or after flight (e.g., at landing). For example, during flight the camera 450 can be configured to switch from shooting images at 30 frames per second to 60 frames per second (fps). In this example, an aerial vehicle 110 may follow a skier down a slope and start capturing images through the camera 450 at 30 fps. As the skier accelerates, e.g., for a jump, the camera 450 automatically switches to capturing images at 60 fps. Also by way of example, if the skier is in the distance, e.g., 20 meters, the camera 450 may being to capture images at 30 fps, but as the aerial vehicle draws closer, e.g., within 5 meters, the camera 450 can automatically switch to capturing images at 60 fps.

Moreover, an operator may seek to switch the camera 450 from taking images, in one mode, e.g., low resolution images (e.g., lower pixel count, lower frames per second, etc.), to taking images in another mode, e.g., high resolution images (e.g., higher pixel count, higher frames per second, etc.), while the aerial vehicle 110 is in flight and the camera 450 is operational. The positioning of the camera 450 can also be further controlled from an operator on the ground transmitting signals from the remote controller 120 or mobile device to move the camera angle through movement of appropriate gimbal 210 components. Further by example, at landing the camera 450 can be configured to take images, e.g., to assist with location analysis for locating the aerial vehicle 110.

Example System Components of the Remote Controller

Figure 6:
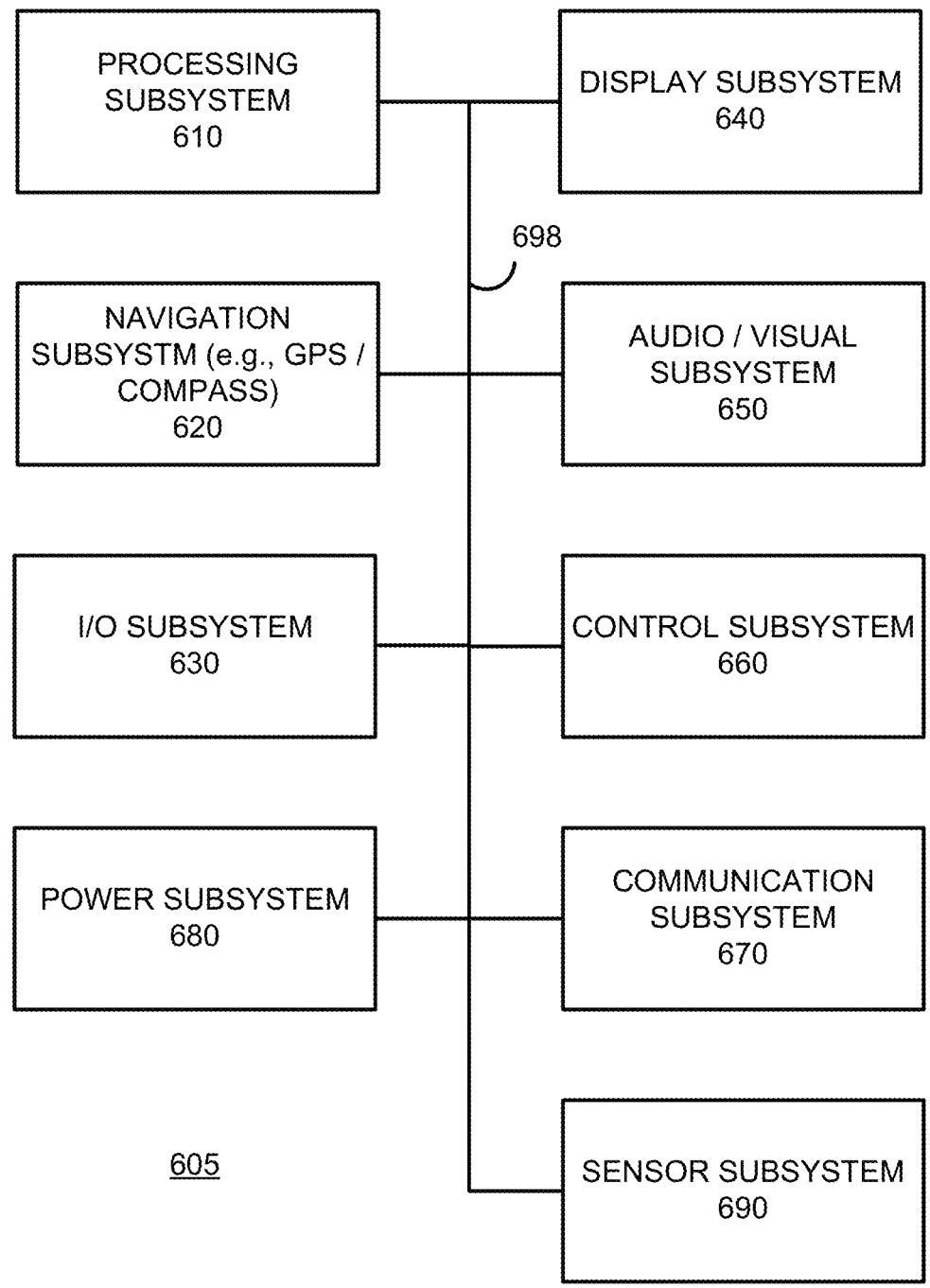
FIG. 6 illustrates a block diagram of an example remote control system of a remote controller.

Referring now to FIG. 6, it illustrates a block diagram of example electronics system 605 components and/or subsystems of a remote controller, e.g., 120. The electronics system 605 may include a processing subsystem 610, a navigation subsystem 620, an input/output (I/O) subsystem 630, a display subsystem 640, an audio/visual (A/V) subsystem 650, a control subsystem 660, a communication subsystem 670, a power subsystem 680, and sensor subsystem 690. The subsystems may be communicatively coupled through a data bus 698 and may be powered, where necessary, through the power subsystem 680.

The processing subsystem 610 may be configured to provide the electronic processing infrastructure to execute firmware and/or software comprised of instructions. The software, which can include firmware, may be referenced as program code, computer program product, or program instructions, and comprises instructions. Software, which may include operating system software, may be executed by one or more processors with the remote controller 120. A processor also may include, for example, controllers, application specific integrated circuits (ASICs) and/or field programmable gate arrays (FPGAs). The processor may be configured to execute the software in a specific manner. Software may be configured to operate with an operating system, which provides an interface to the processor.

The processing subsystem 610, which may include one or more processors, may be part of a machine and/or computer system. FIG. 14 provides an example machine with a processor that can be configured to execute software as part of the processing subsystem 610. It is noted that not all the components of FIG. 14 may be included in the remote controller 120. FIG. 14 is intended to be illustrative in describing an architecture of a computing system, of which all or parts can operate as part of the processing subsystem 610 of the remote controller 120.

The processing subsystem 610 in this example also may be configured to include a remote controller operating system (RCOS). The RCOS may be built upon an operating system kernel, for example, an LINUX kernel, and/or an existing operating system, for example, an ANDROID operating system. In addition, the processing subsystem 610 can provide the execution framework for applications built to operate within the remote controller 120.

The navigation subsystem 620 may include electronics, controls and interfaces for navigation instrumentation for the remote controller 120. These may be embodied in hardware, software, or a combination thereof. For example, the navigation subsystem 620 uses a global position system (GPS) and a compass embodied in hardware (see sensor subsystem 690 below) and/or software for providing coordinates and headings information of the remote controller 120 relative to the aerial vehicle 110. In this example, the GPS and/or compass may be used to track location and heading of the remote controller 120, which can be helpful for the remote controller 120 and the aerial vehicle 110 to computationally understand location and positioning of each relative to the other.

The I/O subsystem 630 may include the input and output interfaces and electronic couplings to interface with devices that allow for transfer of information into or out of the remote controller 120. For example, the I/O subsystem 630 can include a physical interface such as a universal serial bus (USB) or a media card (e.g., secure digital (SD)) slot. The I/O subsystem 630 also can be associated with the communication subsystems 670 to include a wireless interface, e.g., BLUETOOTH or a near field communication interface. In addition, it is noted that in one example embodiment, the aerial vehicle 110 uses long range Wi-Fi radio within the communication subsystem 670, but may also use a second Wi-Fi radio or cellular data radio (as a part of the I/O subsystem 630) for connection other wireless data enabled devices, for example, smart phones, tablets, laptop or desktop computers, and/or wireless internet access points. Moreover, the I/O subsystem 630 may also include other wireless interfaces, e.g., radio frequency tags, cellular (mobile) communication protocols, short range Wi-Fi, etc., for communicatively coupling devices that are similarly wirelessly enabled for short range communications.

The display subsystem 640 may be configured to provide an interface, electronics, and display drivers for the screen 170 of the remote controller 120. The display subsystem 640 can be configured to display information corresponding to the remote controller 120, for example, menus, settings, control information, etc. The display subsystem 640 also can be configured to display images captured from the camera 450 on the aerial vehicle 110. Moreover, the display subsystem can overlay images captured from camera on the aerial vehicle 110 with a display of gauges corresponding to metadata associated with captured frames in a "dashboard" type visual display.

The A/V subsystem 650 may include the interfaces, electronics, and drivers for an audio output (e.g., headphone jack or speakers) as well as visual indicators (e.g., LED lighting associated with, for example, the buttons 160, 165). The A/V subsystem 650 can be configured to provide alarms, indicators, or other types of notifications audibly, visually, or a combination thereof. The notifications can be in voice format. The A/V subsystem 650 can provide notifications corresponding to operation of the aerial vehicle 110 and/or the remote controller 120. For example, if battery power level drops below predetermined threshold on the aerial vehicle 110, the aerial vehicle 110 can communicate this information back to the remote controller 120. The communication subsystem 670 of the remote controller 120 receives this information and it gets passed to the A/V subsystem 650. The A/V subsystem 650 can provide a visual notification, e.g., flashing or lighting an LED or light in red and/or an audible notification such as a beeping alarm and/or pre-recorded voice notice ("low battery"). The A/V subsystem 650 also can provide notifications of other devices that may be communicatively coupled with the remote controller 120, e.g., a smartphone coupled with the remote controller 120 through a BLUETOOTH connection.

The control subsystem 660 may include electronic and control logic and firmware for operation with the control panels 150, 155. The control subsystem 660 translates movements made through the control panels 150, 155 into appropriate movement commands corresponding to the aerial vehicle 110. The movement commands are transmitted through the communication subsystem 670 described below. The control subsystem 660 can be configured so that coarseness of movements through the control panels 150, 155 can be calibrated prior to transmission to the aerial vehicle 110. For example, users having a "light" touch (e.g., refined, smooth movement) can have touches through the control panels 150, 155 translated by the control subsystem 660 into a greater range of fine movements. Also by example, user with a "heavy" tough (e.g., more "jerky" control) can have touches through the control panels 150, 155 translated by the control subsystem 660 to have a lower range of fine movements to help ensure that such movements to not inadvertently jar the aerial vehicle 110 to an extreme operating condition that may cause it to stop flying.

The communication subsystem 670 may include electronics, firmware and interfaces for communications. The communications subsystem 670 can include one or more of wireless communication mechanisms, for example, Wi-Fi (short and long range), cellular/mobile communication systems (e.g., long term evolution (LTE), 3G/4G/5G), BLUETOOTH, etc. The communication subsystem 670 can include wired communication mechanisms such as Ethernet, USB, and HDMI. The communication subsystem 670 can be used to allow for third-party services to provide over the air or hardwire link updates, such as firmware updates to the remote controller 120. It is noted that in some example embodiments, the communication subsystem 670 can include two (or more) different Wi-Fi radios for communication. For example, one radio can be configured to be a dedicated connection between a Wi-Fi radio in the communication subsystem 670 of the remote controller 120 and a Wi-Fi radio in the communication subsystem 360 of the aerial vehicle 110. This dedicated radio link (or communication coupling) may be for transmitting and receiving communications associated with flight control. The dedicated link can help enhance communication between the devices as no other devices may compete for bandwidth and processing cycles. Continuing with the example, a second radio can be configured for other communications, for example, transmission of images and/or data from the remote controller 120 to another device, e.g., a mobile hotspot, a laptop computer, a tablet, a smartphone, etc.

The power subsystem 680 may include electronics, firmware and interfaces for providing power to the electronics system 605 of the remote controller 120. The power subsystem 680 may include direct current (DC) power sources (e.g., batteries, which may be rechargeable), but also can be configured for alternating current (AC) power sources. The power subsystem 680 also may include power management processes for extending DC power source lifespan.

In some embodiments, the power subsystem 680 may be comprised of power management integrated circuit and a low power microprocessor for power regulation. The microprocessor in such embodiments is configured to provide very low power states to preserve battery, and ability to wake from low power states from such events as a button press or an on-board sensor (like a Hall effect sensor) trigger. It is noted that the power subsystem 680 may include a battery system that is replaceable and/or rechargeable. The battery can include a high energy storage capacity and can be configured to couple its power line with an interface, e.g., a universal serial bus interface, to which other devices, e.g., the aerial vehicle 110, a mobile computing device, etc., can connect to have their batteries charge using this battery source.

The sensor subsystem 690 may include a wide range of sensors. For example, in addition to a GPS, the remote controller 120 also may include sensors such as barometer, temperature, altitude, moisture, etc. The sensor data from the sensors can be integrated with images received from a camera. The sensor data can augment or supplement the sensor data captured and received from the aerial vehicle 110 and/or the camera 450. When the image is displayed (real time or from storage), the sensor data can be extracted from it can be provided for display on a screen, e.g., the screen 170 of the remote controller 120 or a screen of a computing device (e.g., laptop, smartphone, tablet, or desktop computer). The sensor data from the sensor subsystem 690 also can be used to assist with aerial vehicle 110 operations.

Pipeline Video Interface for Camera System

Turning now to preparing a camera mounted on an aerial vehicle, e.g., 110 to send frames to a display on the remote controller, when the aerial vehicle 110 is in flight, the disclosed configuration includes a method for reducing the latency of the wireless transfer of frames from the camera (e.g., 450) to the display (e.g., 170).

Figure 7A:
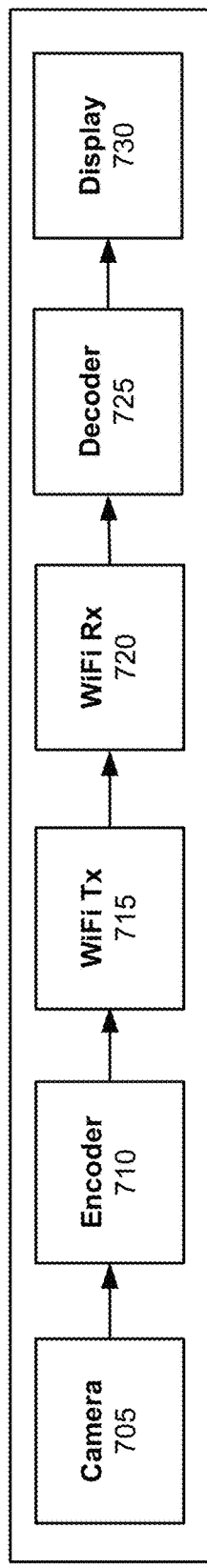
FIG. 7A illustrates a block diagram of the video pipeline, according to an example embodiment.

FIG. 7A illustrates a block diagram of the video pipeline and the latency through each module of the pipeline, according to an example embodiment. The video pipeline system 702 includes a camera module 705, an encoder module 710, a Wi-Fi transmitter (Wi-Fi Tx) module 715, a Wi-Fi receiver (Wi-Fi Rx) module 720, a decoder module 725 and a display module 730. The camera module 705, encoder module 710 and the Wi-Fi Tx module 715 are a part of the camera system 450 mounted on the aerial vehicle 110. The camera module 705 and the encoder module 710 may be a part of the image processor 516 of the camera system 450. The Wi-Fi Tx module 715 may be a part of the I/O interface 560 of the camera system 450. The Wi-Fi Rx module 720, the decoder module 725 and the display module 730 may be part of the remote controller 120 (e.g. as part of the electronics system 605) of the aerial vehicle 110 located on the ground. Specifically, the Wi-Fi Rx module 720 may be a part of the communication subsystem 670 and the decoder module 725 may be a part of the processing subsystem 610, and the display module 730 may be a part of the display subsystem 640. It is noted that the modules may be embodied as software (including firmware) comprised on program code (or software or instructions) executable by the processing subsystem 610.

Figure 7B:
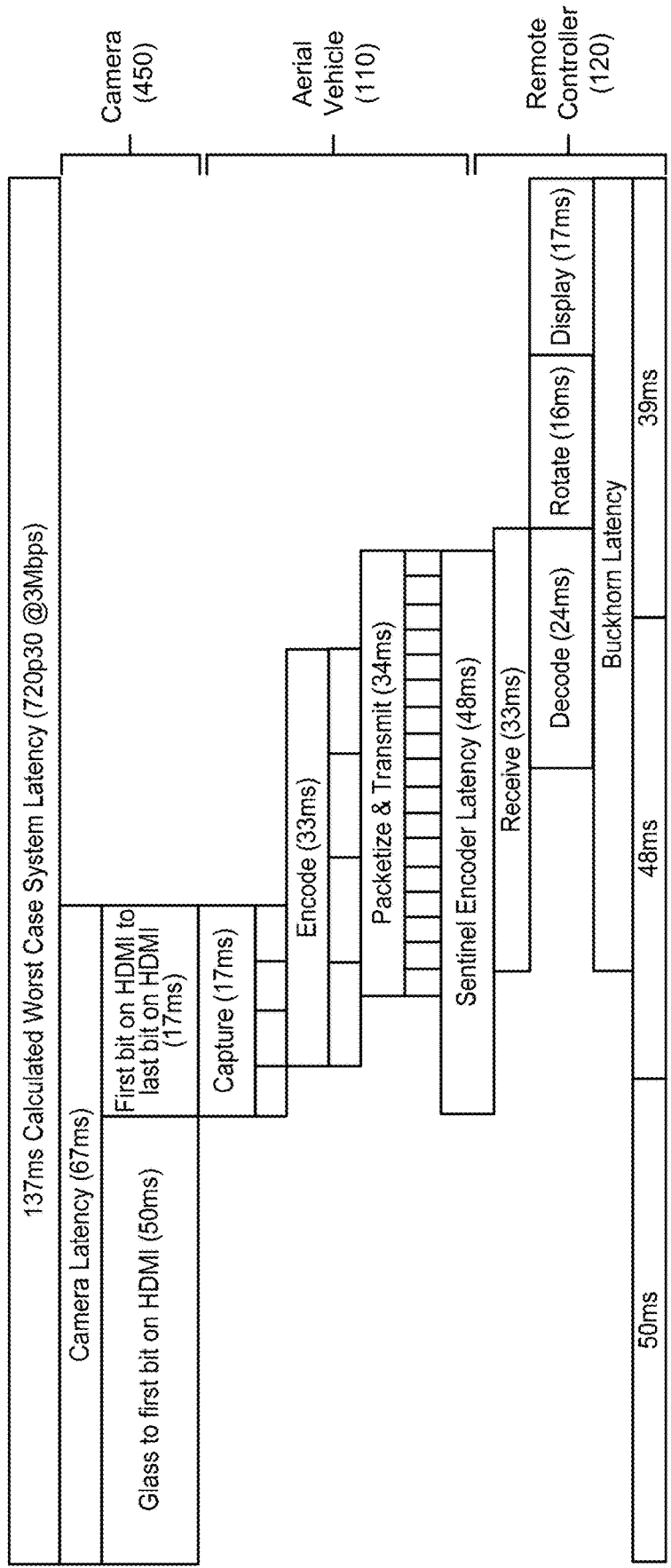
FIG. 7B illustrates a time chart of the latency through each module of the pipeline, according to an example embodiment.

Additionally, FIG. 7B illustrates the latency of a single frame through each module in the pipeline. The camera module 705 captures a frame, using the camera lens and sends the first bit to the last bit of an image or a frame to the HDMI port. This is known as the capture time. The captured frame may be processed by the encoder module 710. The processing may include converting the frame to a standard format such as JPEG, MPEG or any other such format. The processed frame is packetized and transmitted by the Wi-Fi Tx module. The encoding, packetizing and transmitting together may be the frame latency. The Wi-Fi Rx module 720 receives the frame, the decoder module 725 decodes and rotates the frame and the display module 730 displays the frame. The receiving, decoding, rotating and displaying time together is the display latency. The sum of the capture time, frame latency and display latency may be the total latency of a single frame.

The total latency of a frame without pipelining may be, for example, approximately 224 ms (67 ms at the camera module 705+50 ms at the encoder module 710+34 ms at the Wi-Fi Tx module 715+33 ms at the Wi-Fi Rx module 720+40 ms at the decoder module 725+17 ms at the display module 730). As shown in FIG. 7B, the camera latency (67 ms) includes the time taken by a camera lens (glass) to capture and deliver the first bit on HDMI (50 ms) and latency of propagation of the first bit to last bit from the camera lens on HDMI (17 ms). The encoder module latency of 50 ms includes the capture the bits from HDMI to the encoder (17 ms) and the encoding latency (33 ms). The 34 ms at the Wi-Fi Tx module 715 includes latency involved in packetizing and transmitting the frame bits. The receiver latency to receive all the bits of a frame by the Wi-Fi Rx module 720 is 33 ms. The decoder latency of 30 ms includes latency of decoding the bits of the frame (24 ms) and rotating (or post-processing) any bits of the frame (16 ms). Finally, the display latency is 17 ms.

The total latency shown in FIG. 7B may be the reduced latency, obtained by pipelining the processing elements involved in capturing a frame by a camera system (e.g., 450), processing the frame by the aerial vehicle (e.g., 110) and displaying the frame by a remote controller (e.g., 120). The total latency may be reduced by breaking each processing element into smaller tasks that can be computed in parallel or can be pipelined, contributing to reducing the total latency. The different systems and methods of reducing the total latency are described below with respect to FIGS. 8-11.

Figure 8:
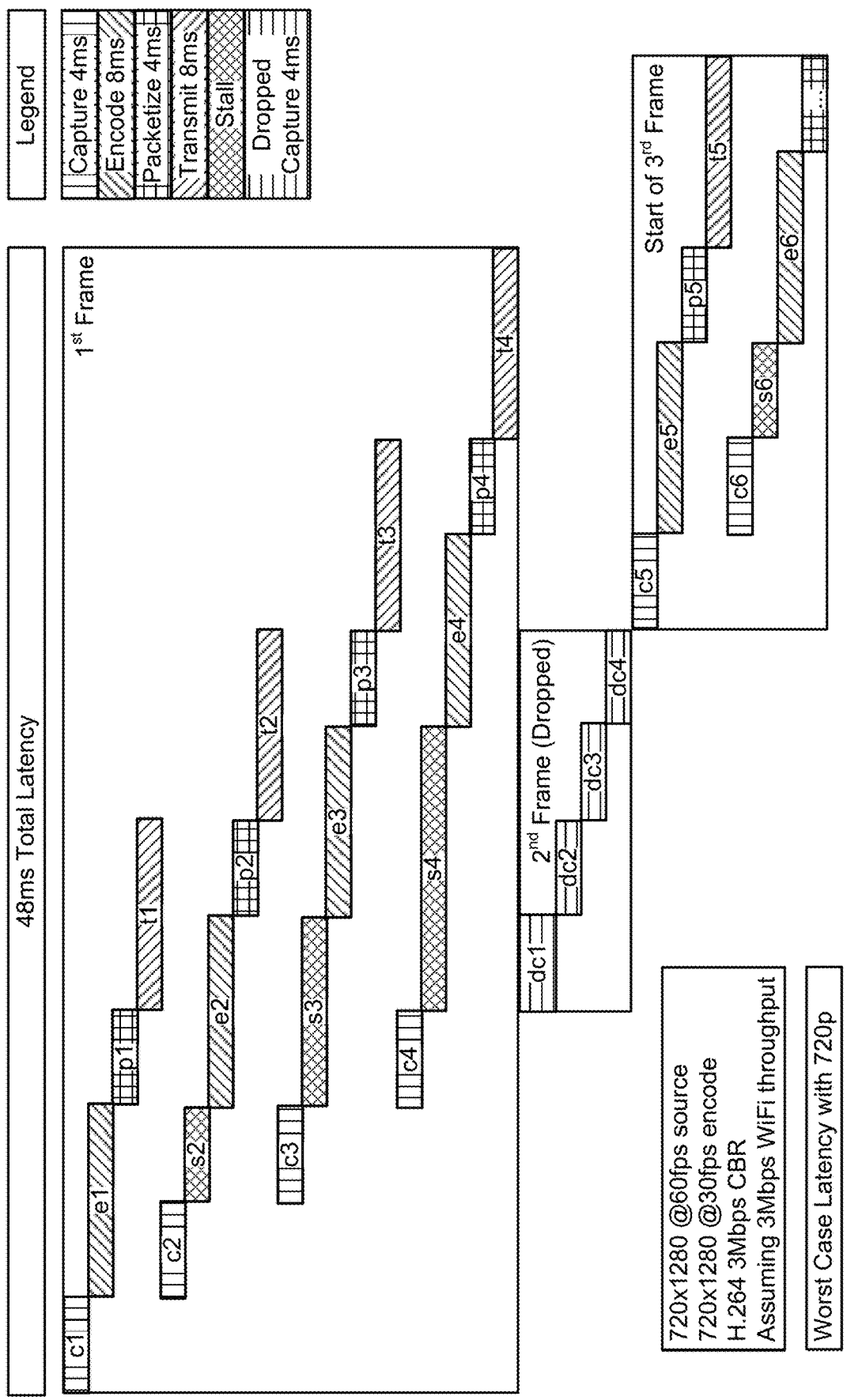
FIG. 8 illustrates multiple frames through different stages of a video pipeline, according to an example embodiment.

FIG. 8 illustrates multiple frames through different stages of a video pipeline, according to an embodiment. The video pipeline includes five stages within the encoder and Wi-Fi Tx module, representing the frame latency in the system. The five stages are capture (c1, c2, c3 . . . cn), encode (e1, e2, e3 . . . en), packetize (p1, p2, p3 . . . pn), transmit (t1, t2, t3 . . . tn) and stall (s1, s2, s3 . . . sn) in each stage corresponding to a last packet. The figure shows three frames through the different stages of the pipeline. Every other frame is dropped as a result of image pipeline over-clocking. The image pipeline overclocking is described in detail with respect to FIG. 9A.

Each stage from capture to transmit may be pipelined and lined up in time such that every frame may be transmitted immediately after the one before it. A stall stage may be inserted between the pipeline stages to comply with worst case transmission calculations, i.e., every transmit stage of consecutive frames must follow each other, i.e., t1 follows t2, t2 cannot be sent until t1 finishes. If the transmit occurs slower than the frame latency, the frame is dropped (e.g., 2nd frame in the figure).

Pipeline overclocking uses the fastest possible clock frequency and frame rate in the camera system to minimize latency. Data may be dropped or decimated later to get back to the desired frame rate. For example, a camera system that will transmit frames at 30 frames per second needs to run its capture hardware clock at a frequency of 1/30 seconds to process one frame and thus have an average input latency of 1/(30*2) seconds. If the camera system is capable of running the hardware clock at a frequency high enough to capture 60 frames per second, the average input latency is reduced to 1/(60*2) seconds and a single frame processing would complete in 1/60 seconds, thus reducing an overall frame latency.

Figure 9A:
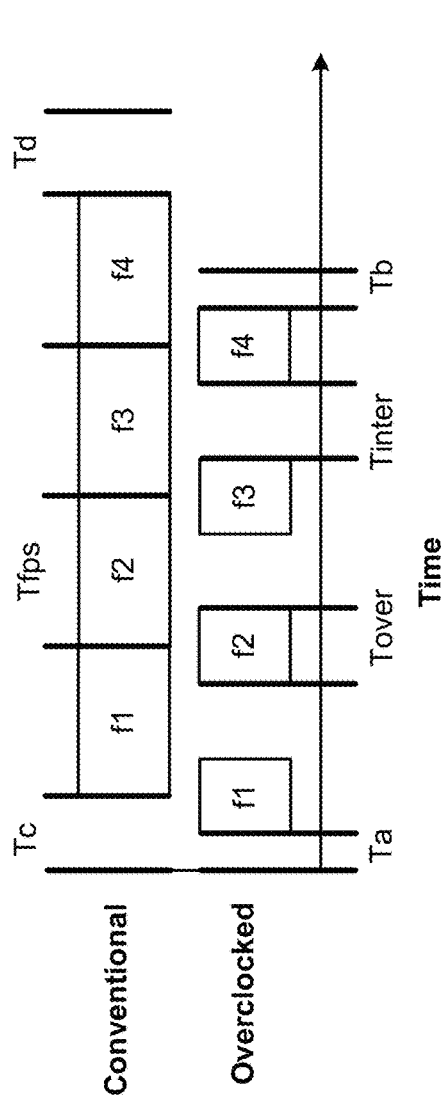
FIG. 9A illustrates overclocked frames, according to an example embodiment.
Figure 9B:
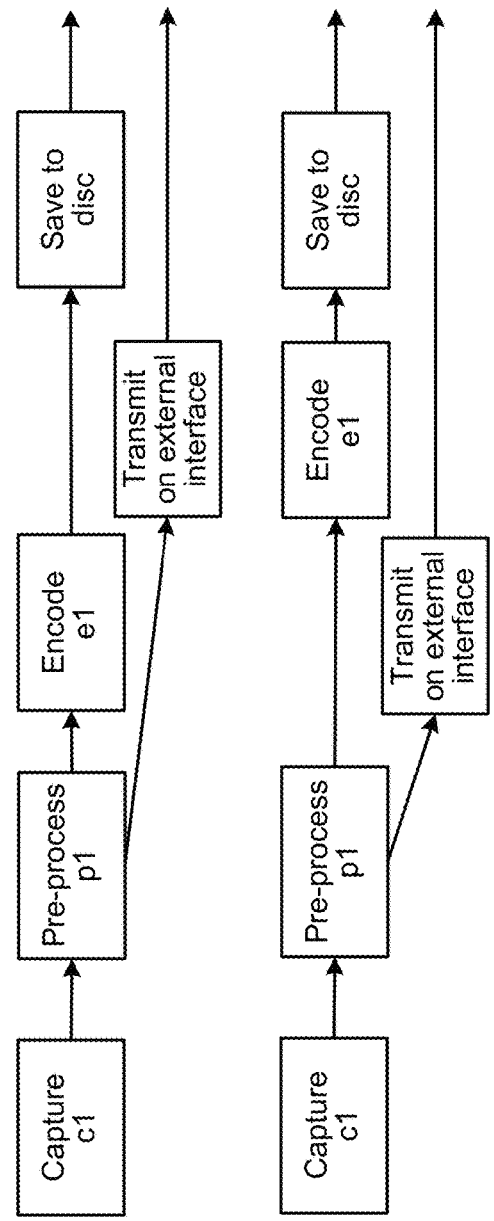
FIG. 9B illustrates forwarded frames, according to an example embodiment.

FIG. 9A illustrates a conventional and overclocked frames, and its impact on input, output, and frame latency, according to an embodiment. For a frame rate, "f" in frames per second, the time for processing one frame (Tfps) is 1/f seconds, the input latency (Tc) and the output latency (Td) is Tfps/2. The overclocked system may be clocked at twice the speed of a conventional system as shown in FIG. 9A. The time for processing one frame (Tover) is Tfps/2 seconds, the input latency (Ta) and the output latency (Tb) is Tover/2. Tinter is the time between processing frames 1−(Tfps/2), this time is idle and is used to perform other operations in the video pipeline discussed above with respect to FIG. 7. As the rate of overclocking increases, the processor idle time increases and the frame latency can be improved by a theoretical maximum of $T(\text{improvement theoretical max}) = Tc + Td + Tfps = 2*Tfps.$ FIG. 9B further illustrates pipeline forwarded frames, according to an example embodiment. Pipeline forwarding may include performing latency sensitive external operations prior to the latency insensitive ones. For example, a camera 450 may capture an image in stage c1 of a video pipeline as shown in FIG. 8, in an alternate embodiment, the image may be preprocessed in the p1 stage before encoding in the e1 stage and sent on the Wi-Fi interface without encoding or packetizing it. The captured frame may be encoded e1 in a later stage of the pipeline and stored on a storage system for accessing it in the future. The encoding and packetizing of the image may be latency insensitive and thus, can be performed at a later stage of the pipeline.

The figure shows a re-arrangement of the stages of the pipeline for two frames. For both the frames, the images may be transmitted on an external interface (i.e. transmit stage), such as an HDMI or Wi-Fi Tx, after preprocessing p1 (can be a part of the encode stage or a separate stage) the frame. The frames are encoded later and saved on a storage medium such as a disk for using it in the future. The frame may be forwarded from one pipeline stage to another pipeline stage. It is noted that the latency insensitive stages may be skipped to reduce the total latency for processing the frame.

Figure 10:
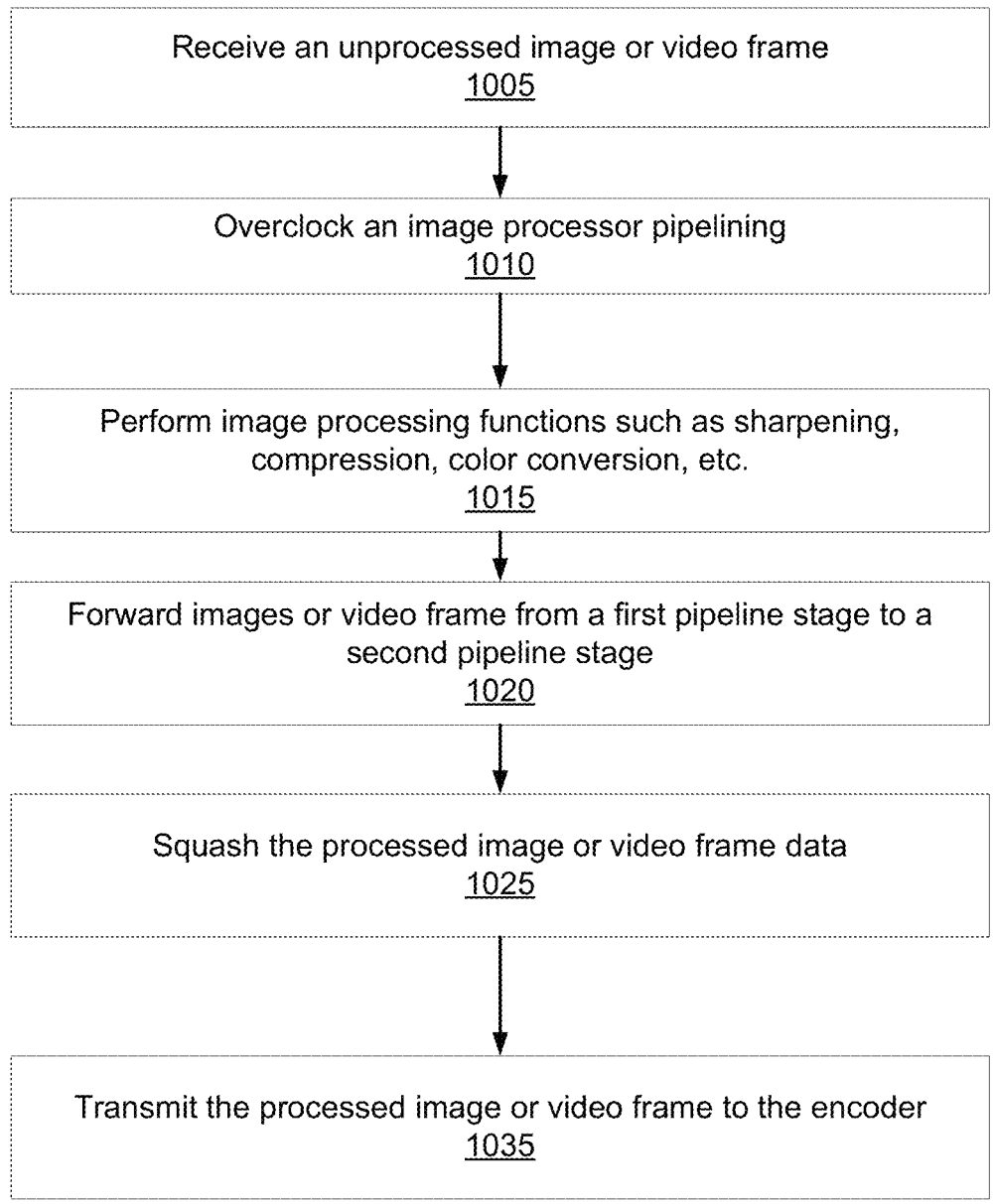
FIG. 10 illustrates a flowchart of a method for pipelining frames through a low latency camera system, according to an example embodiment.

FIG. 10 illustrates a flowchart of a method (or process) for pipelining frames through a low latency camera system, according to an example embodiment. The method can be performed using components of a machine architecture for example, as described in FIG. 14. The camera module 705 captures a frame and transmits it from the camera lens to an HDMI or other similar port. The unprocessed frame is received 1005 by the low latency camera system and may be processed through a video/image pipeline 702. The video/image pipeline 702 may be overclocked 1010 to gain the idle processor time between frames. The image/video processing functions such as sharpening, compression, color conversion, etc., of the frames are performed 1015 in the encoding stage of the pipeline, with the pipeline overclocked to reduce the total latency for processing the frame.

An image processor on the low latency camera system detects the frames that do not require encoding or other pipeline stages to be performed before transmitting them, for example, by detecting a control flag in the incoming frame. The pipeline forwarding feature may be activated 1020 on such frames. Alternatively, pipeline forwarding may be activated on all incoming frames by setting a control switch in an image processor, e.g., image processor 516.

If an external interface such as an HDMI is present in the total latency path, wire squashing is performed 1025 on the processed frame to further reduce the latency. Wire squashing further includes overclocking an external interface clock, external interface synchronization and data forwarding.

The external interface may be clocked at the frame rate and the data to be transmitted is spread across the entire frame time. To reduce the total latency, the external interface clock is clocked as fast as possible, i.e., overclocked. Due to overclocking, the data to be transmitted is sent in bursts on the external interface that leads to idle time between frames.

The external interface synchronization method aligns the external clock, frame sync and line sync to start exactly when the data is ready from the video pipeline. There is no buffering necessary between the video pipeline and the external interface, leading to a reduction in the total frame latency.

Conventional camera systems have symmetrical frame blanking at the beginning and end of each frame as well as line blanking at the beginning and end of each line. The data forwarding moves all the frame data to the beginning of the transmission, and the blanking information is sent after the frame has been transmitted, thus reducing the total frame latency. Once the processed frame is squashed, the processed frame may be transmitted 1035 to the encoder module.

Figure 11:
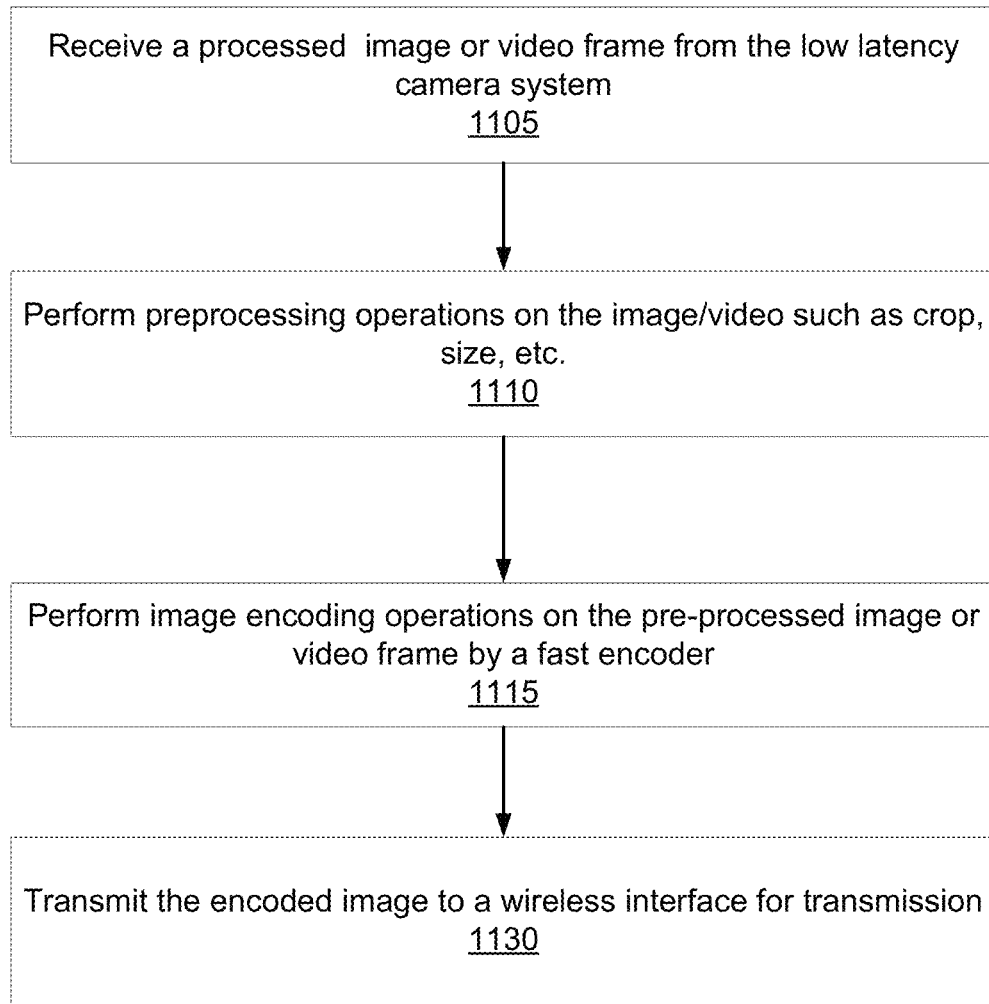
FIG. 11 illustrates a flowchart of a method for pipelining frames through an encoder, according to an example embodiment.

FIG. 11 illustrates a flowchart of an example method for pipelining frames through an encoder, according to an example embodiment. A processed frame may be received 1105 by a hardware image pre-processor (e.g., may be included in image processor 516) that performs 1110 image processing operations such as scaling, resizing, cropping, etc. prior to encoding the frame. A fast encoder such as a hardware encoder is selected over a software encoder to reduce the total latency. The hardware encoder performs 1115 slice based encoding. The input frames are encoded as soon as a fraction or slice of the frame is available. This eliminates the need for an input buffer, and thus eliminating the addition of the latency incurred by an input buffer.

Additionally, the selected hardware encoder supports slice based encoding at the output, i.e., the encoded slices of frames may be sent 1130 out to the wireless interface (Wi-Fi Tx). The hardware encoder does not wait for an entire frame to be encoded before transmission. This eliminates can eliminate the need for an output buffer, thus eliminating the addition of latency incurred by an output buffer.

Figure 12:
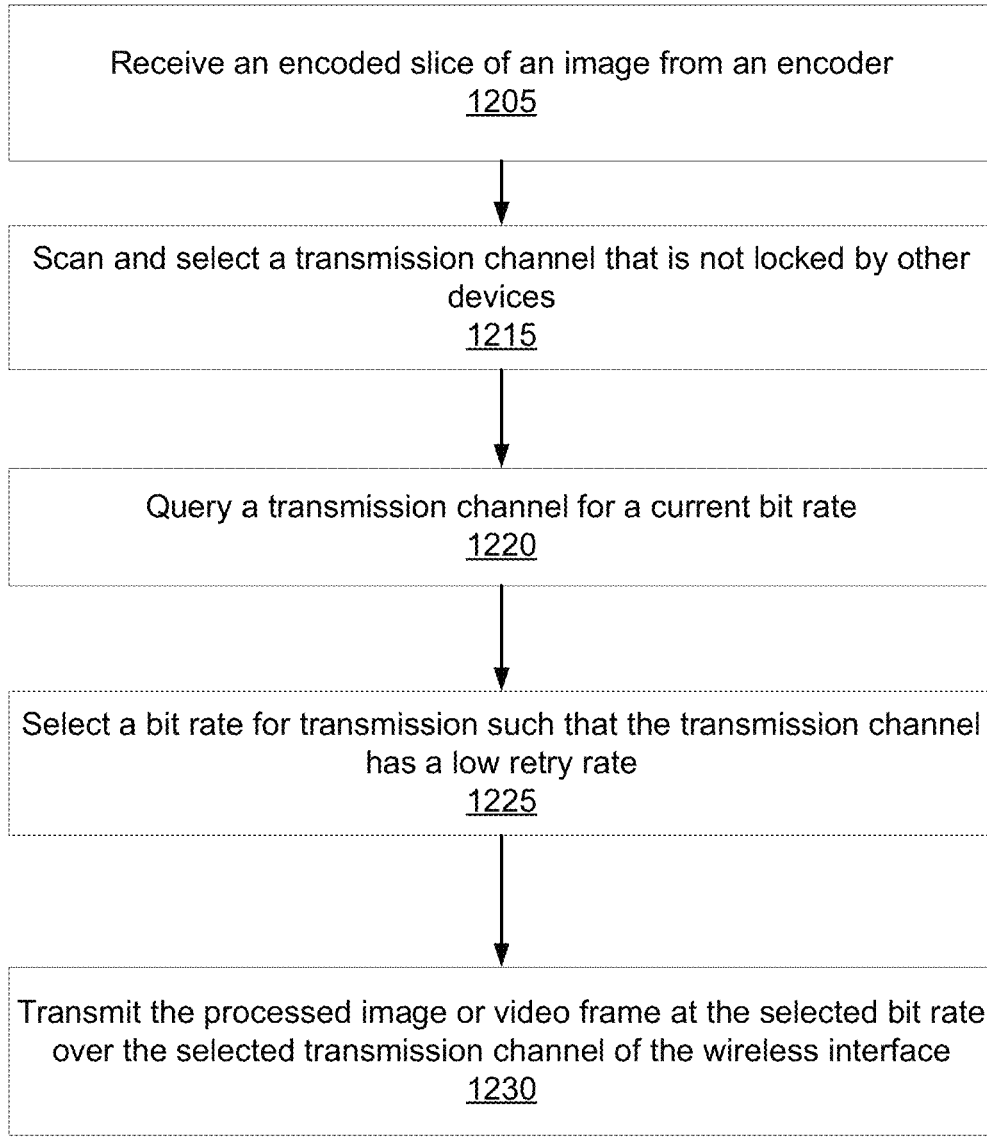
FIG. 12 illustrates a flowchart of a method for pipelining frames through a wireless interface, according to an example embodiment.

FIG. 12 illustrates a flowchart of a method for pipelining frames through a wireless interface, according to an example embodiment. A wireless transmit interface may receive 1205 an encoded slice of a frame that has a size equal to a maximum transmission unit (MTU) supported by the wireless system interface. The encoded frame of MTU size is transmitted over the wireless interface. Conventional systems use a transmit buffer to store the MTU sized frame slices and transmit over the wireless interface on receiving an entire frame. The MTU based transport transmit method does not wait for receiving the entire frame, thus eliminating the need for the transmit buffer and eliminating the addition of the latency incurred by a transmit buffer.

The wireless medium may be tuned using one or more of the methods described below to reduce the total latency. The methods for reducing the latency through the wireless medium further include queue sizing, queue flushing, bitrate feedback, physical medium rate feedback, dynamic encoder parameter tuning and wireless radio parameter adjustment. The wireless transmitters use queues that are sized to hold one encoded frame of incoming data. The data may be dropped once the queue is full to reduce the number of out-of-date frames being transmitted when the wireless throughput drops below the required throughput to transmit video without loss. The transmit queue may be flushed out, i.e. emptied, when the data in the queue is detected to be old due to lack of transmission or switching of transmit or encoder parameters. This prevents transmission of irrelevant data, thus saving on transmit and retry latency.

The wireless interface determines the current capability of the wireless link by way of an algorithm that calculates the average instantaneous video throughput, i.e. the bit rate. The bit rate may be fed back to the encoder to select the encoder Q factor. This results in a larger or smaller encoded video throughput and reduces the number of frames that will be dropped, which significantly affects the total video frame latency.

Similar to the bitrate feedback, the wireless interface determines the current modulation rate of the physical medium and is fed back to the encoder. This provides a bitrate ceiling of the instantaneous throughput rate as well as a predicted throughput in the near future. Feeding the modulation rate back to the encoder block allows a better estimate of the bitrate that is used to encode frames as well as data. This further reduces latency by helping to reduce the number of frames that are dropped.

The encoder dynamically selects encoder parameters such as resolution, frame rate, compression factor, and bitrate based on the current state of the wireless medium (i.e. the bitrate feedback or the modulation rate feedback or any other such parameter of the wireless medium). This may reduce latency by helping to reduce the number of frames that are dropped.

The wireless radio parameters may be adjusted for low latency camera systems that use the 802.11 standard. The burst rate parameter may be adjusted such that a reduced number of acknowledgements are needed for each frame that is transmitted. This reduces the total latency. The retry rate parameter may be set to a lower rate, so that data is dropped rather than retransmitted. This may prevent incurring latency when the instantaneous bitrate is low.

Figure 13:
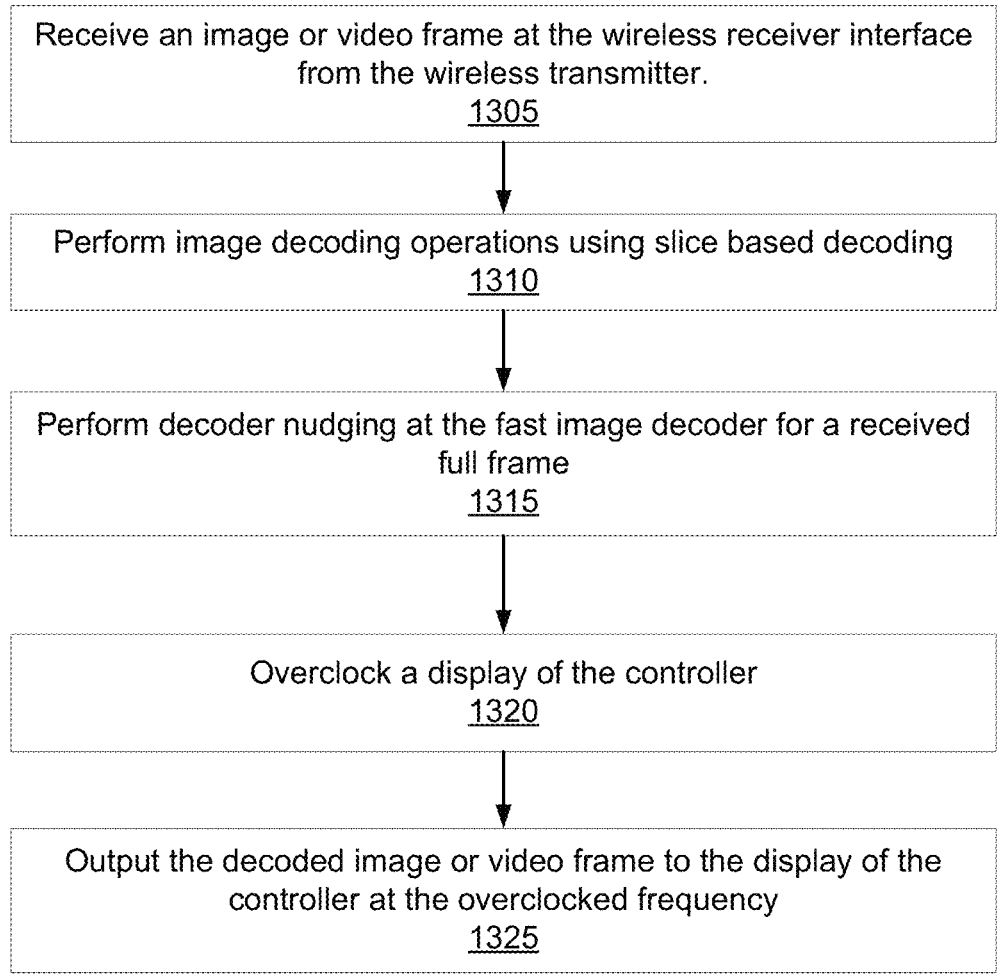
FIG. 13 illustrates a flowchart of a method for pipelining frames through the remote controller, according to an example embodiment.

FIG. 13 illustrates a flowchart of a method for pipelining frames through the remote controller, according to an example embodiment. In one embodiment, a remote controller may include a Wi-Fi Rx module, a decoder module and a display module. The Wi-Fi Rx module receives 1305 the frame transmitted from the Wi-Fi Tx module, over the wireless interface. The Wi-Fi Rx module may receive MTU sized chunks of data and are de-packetized on arrival. Conventional modules include a receiver buffer and wait for de-packetizing until a full frame is received. The Wi-Fi Rx module eliminates the need for the receiver buffer and reduces the total latency by eliminating the latency through the buffer.

The received frame or image may be sent to the decoder. A fast hardware decoder that performs 1310 decoding operations using slice based decoding is selected. The fast hardware decoder may be overclocked. The slice based decoding method may include operating the fast hardware decoder on a fraction of the frame, thus eliminating the need for buffers and reducing total latency.

Conventional decoders wait till the beginning of a new frame before the previous frame is sent to the next module such as display. Unlike the conventional decoders, the fast hardware decoder further may include a method known as decoder nudging. The decoder nudging method may include sending a signal 1315 to the fast hardware decoder as soon as the last data of the current frame is at the input of the decoder. The decoder nudging signal may be as simple as inserting dummy data to push a frame out. The fast hardware decoder makes the entire decoded frame available to the next module as soon as the decode of each frame is completed. The fast hardware decoder does not wait for the frame blanking to be decoded before making the decoded frame available to the next module. The latency may be reduced by an amount equivalent to the frame blanking time between the frames.

The decoded image may be post processed before providing the image to the display. The frame post processing may be done by a hardware image processing module to maximize parallel processing and to avoid having the image/video pipeline display stage being executed in software.

The post processed image may be sent to the display module. Conventional display systems match the display refresh rate to the frame rate of the low latency camera system. The display module is overclocked 1320 to run the display at the fastest possible refresh rate to reduce the display latency and thus the overall latency. The frame is sent 1325 to the display at the overclocked refresh rate.

Example Machine Architecture

As has been noted, the remote controlled aerial vehicle 110 can be remotely controlled from the remote controller 120. The aerial vehicle 110 and the remote controller 120 are machines that that be configured operated using software. FIG. 14 is a block diagram illustrating components of an example machine able to read instructions from a machine-readable medium and execute them in one or more processors (or controllers). All or portions of the example machine described in FIG. 14 can be used with the aerial vehicle 110 or the remote controller 120 and/or other parts of a system that interfaces with the aerial vehicle 110 and/or remote controller 120.

In FIG. 14 there is a diagrammatic representation of a machine in the example form of a computer system 1400. The computer system 1400 can be used to execute instructions 1424 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine in this example is a handheld controller to control the remote controlled aerial vehicle. However, the architecture described may be applicable to other computer systems that operate in the system of the remote controlled aerial vehicle with camera and mounting configuration, e.g., in setting up a local positioning system. These other example computer systems include a server computer, a client computer, a personal computer (PC), a tablet PC, a smartphone, an internet of things (IoT) appliance, a network router, switch or bridge, or any machine capable of executing instructions 1424 (sequential or otherwise) that specify actions to be taken by that machine. Further, while only a single machine is illustrated, the term "machine" shall also be taken to include any collection of machines that individually or jointly execute instructions 1424 to perform any one or more of the methodologies discussed herein.

The example computer system 1400 includes one or more processing units (generally processor 1402). The processor 1402 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor 1402 and the memory 1404 can be a part of the flight controller 315, image processor 516 and/or the processing subsystem 610. The computer system 1400 also includes a main memory 1404. The computer system may include a storage unit 1416. The processor 102, memory 1404 and the storage unit 1416 communicate via a bus 1408.

In addition, the computer system 1406 can include a static memory 1406, a display driver 1410 (e.g., to drive a plasma display panel (PDP), a liquid crystal display (LCD), or a projector). The computer system 1400 may also include input/output devices, e.g., an alphanumeric input device 1412 (e.g., a keyboard), a dimensional (e.g., 2-D or 3-D) control device 1414 (e.g., a mouse, a trackball, a joystick, a motion sensor, or other pointing instrument), a signal generation device 1418 (e.g., a speaker), and a network interface device 1420, which also are configured to communicate via the bus 1408.

The storage unit 1416 includes a machine-readable medium 1422 on which is stored instructions 1424 (e.g., software) embodying any one or more of the methodologies or functions described herein. The instructions 1424 may also reside, completely or at least partially, within the main memory 1404 or within the processor 1402 (e.g., within a processor's cache memory) during execution thereof by the computer system 1400, the main memory 1404 and the processor 1402 also constituting machine-readable media. The instructions 1424 may be transmitted or received over a network 1426 via the network interface device 1420.

While machine-readable medium 1422 is shown in an example embodiment to be a single medium, the term "machine-readable medium" should be taken to include a single medium or multiple media (e.g., a centralized or distributed database, or associated caches and servers) able to store the instructions 1424. The term "machine-readable medium" shall also be taken to include any medium that is capable of storing instructions 1424 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The disclosed configuration beneficially reduces the total latency for transferring a frame from the low latency camera system mounted on an aerial vehicle to the display of the remote controller. The reduced latency allows a user of the remote controller to view the images or videos approximately in sync with the speed of the aerial vehicle. Moreover, the disclosed configurations also can apply to other camera systems to reduce to total frame transfer latency.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 3-13. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., image processor 516 and/or processor 1402, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This description should be read to include one or at least one and the singular also includes the plural unless it is obvious that it is meant otherwise.

Upon reading this disclosure, those of skill in the art will appreciate still additional alternative structural and functional designs for a system and a process for reducing the total latency for transferring a frame from the low latency camera system mounted on an aerial vehicle to the display of the remote controller through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for pipelining a frame over a low latency camera system, the method comprising:
    receiving one or more unprocessed frames captured by the low latency camera system;
    overclocking an image processor pipeline, the overclocking to increase an operating frequency of an image processor of the low latency camera system such that there is idle image processor time between frames;
    performing one or more image processing operations by the image processor on the at least one frame during the idle image processor time between frames, the one or more image processing operations including at least one of sharpening, compression, or color conversion;
    forwarding the processed frame from a first pipeline stage to a second pipeline stage of the image processor that includes a plurality of pipeline stages;
    squashing image data of the processed frame, the squashing to reduce the size of the image data without losing image information, wherein the squashing comprises aligning an external interface in the image processor pipeline to when data is ready from the image processor pipeline to avoid buffering;
    transmitting the processed frame to a fast encoder, the fast encoder comprising a hardware encoder;
    performing one or more preprocessing operations by the image processor on the processed frame, the one or more preprocessing operations including at least one of scaling, resizing, or cropping;
    performing one or more image encoding operations on the preprocessed frame by the fast encoder, the one or more image encoding operations including slice based encoding that encodes input frames when a slice of the preprocessed frame is available to reduce the latency associated with an input buffer; and
    transmitting the encoded frame to a wireless interface for transmission.

2. The method of claim 1, wherein the one or more image processing operations further includes at least one of performing a Bayer transformation, demosaicing, noise reduction, image stabilization, or rolling shutter artifact reduction.

3. The method of claim 1, wherein the overclocking of the image processor pipeline and the squashing of the image data is performed to reduce the latency by at least one frame.

4. The method of claim 1, wherein the squashing is performed in response to detecting an input/output interface, further wherein a clock of the input/output interface is distinct from a clock of the image processor.

5. The method of claim 1, further comprising:
    performing the one or more image processing operations on the one or more unprocessed frames in each of the plurality of pipeline stages.

6. The method of claim 1, further comprising:
    storing the processed frame in memory of the low latency camera system.

7. A non-transitory computer readable medium configured to store instructions, the instructions when executed by a processor cause the processor to:
    receive one or more unprocessed frames captured by the low latency camera system;
    overclock an image processor pipeline, the overclocking to increase an operating frequency of an image processor of the low latency camera system such that there is idle image processor time between frames;
    perform one or more image processing operations by the image processor on the at least one frame during the idle image processor time between frames, the one or more image processing operations including at least one of sharpening, compression, or color conversion;
    forward the processed frame from a first pipeline stage to a second pipeline stage of the image processor that includes a plurality of pipeline stages;
    squash image data of the processed frame, the squashing to reduce the size of the image data without losing image information, wherein the squashing comprises aligning an external interface in the image processor pipeline to when data is ready from the image processor pipeline to avoid buffering;
    transmit the processed frame to a fast encoder, the fast encoder comprising a hardware encoder;
    perform one or more preprocessing operations by the image processor on the processed frame, the one or more preprocessing operations including at least one of scaling, resizing, or cropping;
    perform one or more image encoding operations on the preprocessed frame by the fast encoder, the one or more image encoding operations including slice based encoding that encodes input frames when a slice of the preprocessed frame is available to reduce the latency associated with an input buffer; and
    transmit the encoded frame to a wireless interface for transmission.

8. The non-transitory computer readable storage medium of claim 7, wherein the one or more image processing operations further includes at least one of performing a Bayer transformation, demosaicing, noise reduction, image stabilization, or rolling shutter artifact reduction.

9. The non-transitory computer readable storage medium of claim 7, wherein the overclocking of the image processor pipeline and the squashing of the image data is performed to reduce the latency by at least one frame.

10. The non-transitory computer readable storage medium of claim 7, wherein the squashing is performed in response to detecting an input/output interface, further wherein a clock of the input/output interface is different from a clock of the image processor.

11. The non-transitory computer readable storage medium of claim 7, the instructions when executed by the processor further causing the processor to:
perform the one or more image processing operations on the one or more unprocessed frames in each of the plurality of pipeline stages.

12. The non-transitory computer readable storage medium of claim 7, the instructions when executed by the processor further causing the processor to:
store the processed frame in memory of the low latency camera system.

13. The non-transitory computer readable storage medium of claim 7, wherein the overclocking drops a frame of the one or more unprocessed frames to increase the operating frequency.

14. The non-transitory computer readable storage medium of claim 7, wherein the overlocking increases idle time of the image processor.

15. A low latency video pipelining system, comprising:
a memory; and
a processor configured to execute instructions stored on the memory to:
receive one or more unprocessed frames captured by an imaging device of the low latency video pipelining system;
overclock an image processor pipeline, the overclocking to increase an operating frequency of an image processor of the low latency video pipelining system such that there is idle image processor time between frames;
perform one or more image processing operations by the image processor on the at least one frame during the idle image processor time between frames, the one or more image processing operations including at least one of sharpening, compression, or color conversion;
forward the processed frame from a first pipeline stage to a second pipeline stage of the image processor that includes a plurality of pipeline stages;
squash image data of the processed frame, the squashing to reduce the size of the image data without losing image information, wherein the squashing comprises aligning an external interface in the image processor pipeline to when data is ready from the image processor pipeline to avoid buffering;
transmit the processed frame to a fast encoder, the fast encoder comprising a hardware encoder;
perform one or more preprocessing operations by the image processor on the processed frame, the one or more preprocessing operations including at least one of scaling, resizing, or cropping;
perform one or more image encoding operations on the preprocessed frame by the fast encoder, the one or more image encoding operations including slice based encoding that encodes input frames when a slice of the preprocessed frame is available to reduce the latency associated with an input buffer; and
transmit the encoded frame to a wireless interface for transmission.

16. The low latency video pipelining system of claim 15, wherein the one or more image processing operations further includes at least one of performing a Bayer transformation, demosaicing, noise reduction, image stabilization, or rolling shutter artifact reduction.

17. The low latency video pipelining system of claim 15, wherein the overclocking of the image processor pipeline and the squashing of the image data is performed to reduce the latency by at least one frame.

18. The low latency video pipelining system of claim 15, wherein the squashing is performed in response to detecting an input/output interface, further wherein a clock of the input/output interface is distinct from a clock of the image processor.

19. The low latency video pipelining system of claim 15, wherein the overclocking drops a frame of the one or more unprocessed frames to increase the operating frequency.

20. The pipelining system of claim 18, wherein the squashing includes overclocking the clock of the input/output interface, synchronization of the input/output interface, and data forwarding.

* * * * *